United States Patent
Ogata et al.

(10) Patent No.: US 10,435,260 B2
(45) Date of Patent: Oct. 8, 2019

(54) SHEET CONVEYING APPARATUS, IMAGE FORMING APPARATUS, AND IMAGE READING APPARATUS TO CHANGE THE SHEET CONVEYING DIRECTION BY MOVING A ROTATING MEMBER THAT CONVEYS THE SHEET

(71) Applicant: CANON KABUSHIKI KAISHA, Tokyo (JP)

(72) Inventors: Atsushi Ogata, Mishima (JP); Motohiro Furusawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/948,319

(22) Filed: Apr. 9, 2018

(65) Prior Publication Data

US 2018/0305151 A1 Oct. 25, 2018

(30) Foreign Application Priority Data

Apr. 21, 2017 (JP) .................. 2017-084781

(51) Int. Cl.
*B65H 5/26* (2006.01)
*B65H 5/06* (2006.01)
(Continued)

(52) U.S. Cl.
CPC ............ *B65H 5/26* (2013.01); *B65H 5/062* (2013.01); *B65H 29/125* (2013.01); *B65H 29/14* (2013.01); *B65H 29/22* (2013.01); *B65H 29/58* (2013.01); *B65H 85/00* (2013.01); *H04N 1/00631* (2013.01); *H04N 1/00652* (2013.01);
(Continued)

(58) Field of Classification Search
None
See application file for complete search history.

(56) References Cited

U.S. PATENT DOCUMENTS 5,720,478 A * 2/1998 Carter .................... B65H 15/00
271/186
5,887,868 A * 3/1999 Lambert ................ B65H 5/062
271/186

(Continued)

FOREIGN PATENT DOCUMENTS

| JP | 6-97305 A | 4/1993 |
|----|-----------|--------|
| JP | 2007045542 A | 2/2007 |
| JP | 2015083353 A | 4/2015 |

*Primary Examiner* — Andrew H Lam
(74) *Attorney, Agent, or Firm* — Canon U.S.A., Inc. IP Division

(57) ABSTRACT

A sheet conveying apparatus includes a first rotating member, a second rotating member to convey a sheet in a first direction upon the first rotating member rotating, a third rotating member to convey the sheet in a second direction upon the first rotating member rotating, and a switching unit. The switching unit switches a position of the first rotating member between a first position at which the first and second or first and third rotating members convey the sheet, and a second position at which the first rotating member is retracted. Before a rear end of the sheet has been conveyed by the first rotating member and the second rotating member, the switching unit moves the first rotating member from the first position towards the second position. The switching unit stops a movement of the first rotating member at a position between the first position and the second position.

20 Claims, 22 Drawing Sheets

(51) Int. Cl.
*B65H 29/58* (2006.01)
*H04N 1/00* (2006.01)
*B65H 29/22* (2006.01)
*B65H 85/00* (2006.01)
*B65H 29/12* (2006.01)
*B65H 29/14* (2006.01)

(52) U.S. Cl.
CPC ............... *B65H 2301/3332* (2013.01); *B65H 2301/33312* (2013.01); *B65H 2404/144* (2013.01); *B65H 2404/1522* (2013.01); *B65H 2801/06* (2013.01); *H04N 1/00795* (2013.01); *H04N 1/00933* (2013.01)

(56) References Cited

U.S. PATENT DOCUMENTS

| | | | | |
|---|---|---|---|---|
| 7,918,451 B2 * | 4/2011 | Honda | ................... | B65H 29/12 271/186 |
| 10,087,029 B2 * | 10/2018 | Ogata | ................... | B65H 15/00 |
| 2002/0158404 A1 * | 10/2002 | Carter | ................... | B65H 15/00 271/186 |
| 2003/0071409 A1 * | 4/2003 | Sumi | ................... | B65H 5/36 271/186 |
| 2008/0179822 A1 * | 7/2008 | Tu | ................... | H04N 1/00572 271/186 |

* cited by examiner

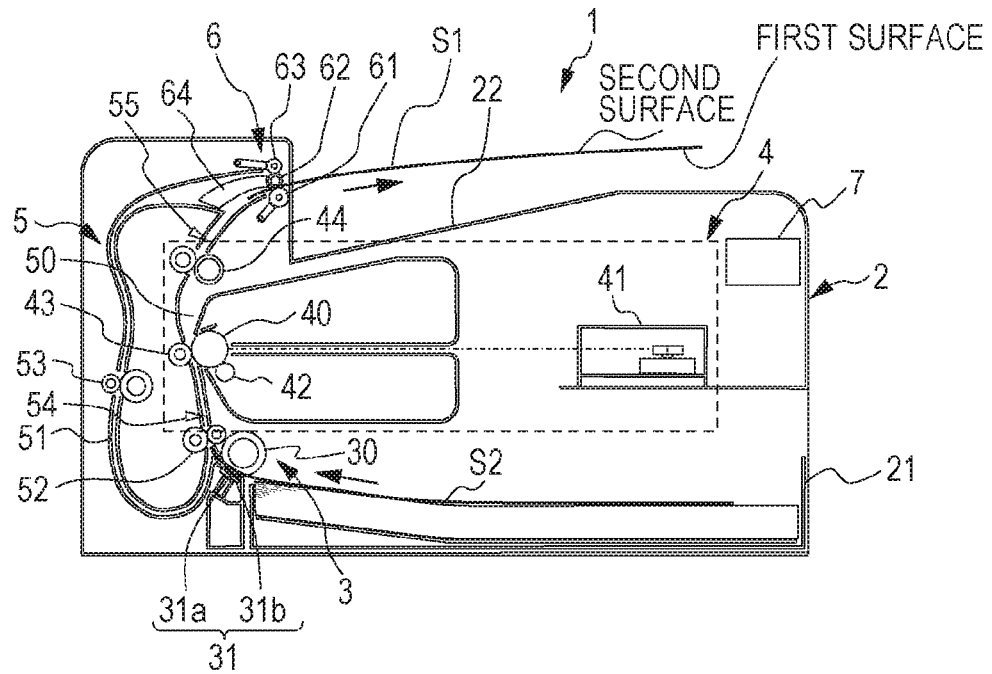
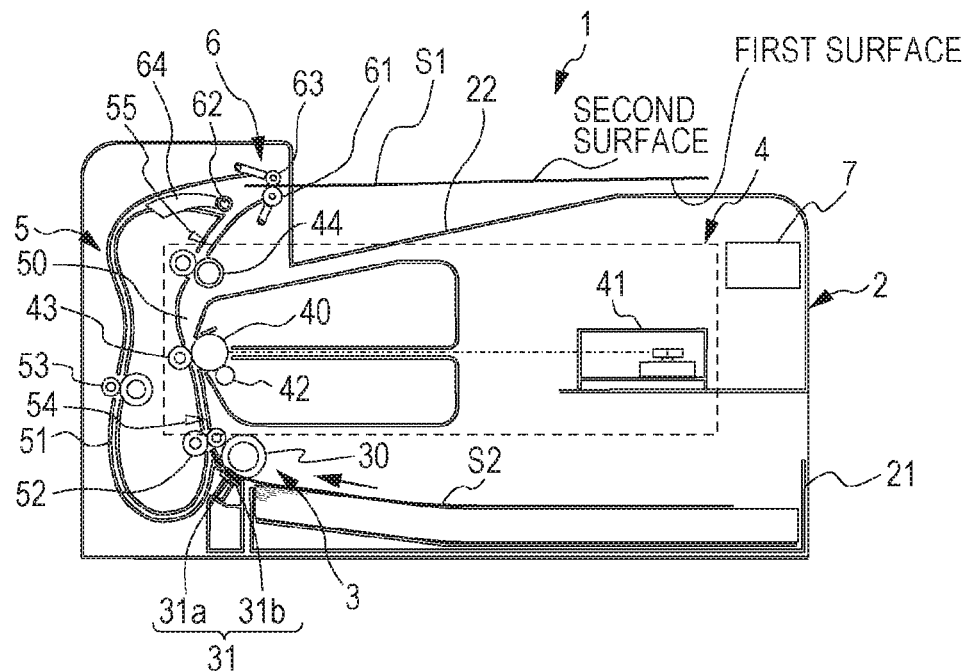

SHEET CONVEYING APPARATUS, IMAGE FORMING APPARATUS, AND IMAGE READING APPARATUS TO CHANGE THE SHEET CONVEYING DIRECTION BY MOVING A ROTATING MEMBER THAT CONVEYS THE SHEET

BACKGROUND OF THE INVENTION

Field of the Invention

The present disclosure relates to a sheet conveying apparatus that conveys sheets in a continuous manner, an image forming apparatus, such as a copier, a printer, or a facsimile, that includes the sheet conveying apparatus, and an image reading apparatus.

Description of the Related Art

In recent years, measures further saving resources are awaited in image forming apparatuses and double-side printing on sheets, such as paper, an overhead projector (OHP) sheet, a plastic sheet, and fabric, is frequently performed. Accordingly, in an image forming apparatus that has a double-side printing function, importance is placed on improving the number of sheets that is output per unit time during double-side printing, in other words, importance is placed on improving the productivity of both-side printing.

As a known art, a configuration is disclosed in Japanese Patent Laid-Open No. 2015-083353 in which a group of reversing rollers that includes a single driving roller that receives a driving force and that rotates in only one direction, a first driven roller, and a second driven roller is provided in a reversing unit that reverses a sheet. Regarding the configuration of the group of reversing rollers, the three rollers are arranged in the order of the first driven roller, the driving roller, and the second driven roller so as to be aligned on a substantially straight line in a direction intersecting a sheet conveying direction. The first driven roller opposing the driving roller forms a first nip portion, and the second driven roller opposing the driving roller in a direction different from that of the first driven roller forms a second nip portion.

Sheet reversing is performed in the following manner in the reversing unit in Japanese Patent Laid-Open No. 2015-083353. A sheet, on which an image has been formed on a first surface, is first conveyed towards the first nip portion in the group of reversing rollers. Subsequently, in the first nip portion, the sheet is conveyed in a first direction that is a direction in which the sheet is discharged from the group of reversing rollers, and a rear end of the sheet in the sheet conveying direction passes the first nip portion. A switchback portion that temporarily accommodates the sheet is provided in the reversing unit at a portion downstream of the first nip portion in the sheet conveying direction, and the sheet that has passed the first nip portion is accommodated in the switchback portion. Subsequently, by having the sheet accommodated in the switchback portion fall by its own weight, the rear end of the sheet is guided to the second nip portion in the group of reversing rollers. Since the driving roller rotates in only one direction, the sheet pinched by the second nip portion is conveyed in a second direction that is a direction opposite the first direction, which is the conveying direction in the first nip portion. Subsequently, the sheet is conveyed to the image forming unit once again and after an image is formed on a second surface of the sheet, the sheet is conveyed to a sheet discharge unit that is provided at a position that is different from that of the reversing unit. Subsequently, the sheet is discharged from the inside of the image forming apparatus with discharge rollers of the sheet discharge unit.

However, in the configuration of Japanese Patent Laid-Open No. 2015-083353, since the reversing of the sheet is performed by moving the rear end of the sheet to the second nip portion with the weight of the sheet itself after the sheet is completely discharged from the first nip portion in the group of reversing rollers to the switchback portion, the following issue occurs. That is, the timing at which the sheet is reversed (the timing from when the sheet passes through the first nip portion until the sheet is pinched by the second nip portion) may greatly differ due to the difference in the sheet thickness or the sheet grammage, or whether there is a flexure (curl) in the sheet. In such a case, the sheet conveying timing may be off with respect to a predetermined timing, or the interval (sheet interval) in which the sheets are conveyed when the sheets are conveyed successively may be off with respect to a predetermined interval, which may lower the sheet conveying performance.

SUMMARY OF THE INVENTION

The present disclosure provides a sheet conveying apparatus that is capable of suppressing decrease in the sheet conveying performance.

According to an aspect of the present invention, a sheet conveying apparatus comprising: a first rotating member configured to rotate in one direction, a second rotating member configured to convey, together with the first rotating member, a sheet in a first direction upon rotation of the first rotating member, a third rotating member configured to convey, together with the first rotating member, the sheet in a second direction upon rotation of the first rotating member, wherein the second direction is a direction different from the first direction, and a switching unit configured to switch a position of the first rotating member between a first position at which the first rotating member conveys the sheet with the second rotating member or the third rotating member, and a second position at which the first rotating member is retracted relative to the first position, wherein, before a rear end of the sheet conveyed in the first direction has been conveyed by the first rotating member and the second rotating member, the switching unit moves the first rotating member from the first position towards the second position, and wherein the switching unit includes a stopping unit configured to stop a movement of the first rotating member at a position between the first position and the second position after the switching unit has moved the first rotating member from the first position towards the second position.

Further features of the present invention will become apparent from the following description of embodiments with reference to the attached drawings.

BRIEF DESCRIPTION OF THE DRAWINGS

FIGS. 11A to 11C are schematic cross-sectional views illustrating a state in the first embodiment in which the conveyance of the sheet is stopped temporarily when an image is continuously formed on both sides of a plurality of sheets.

DESCRIPTION OF THE EMBODIMENTS

Figure 1:
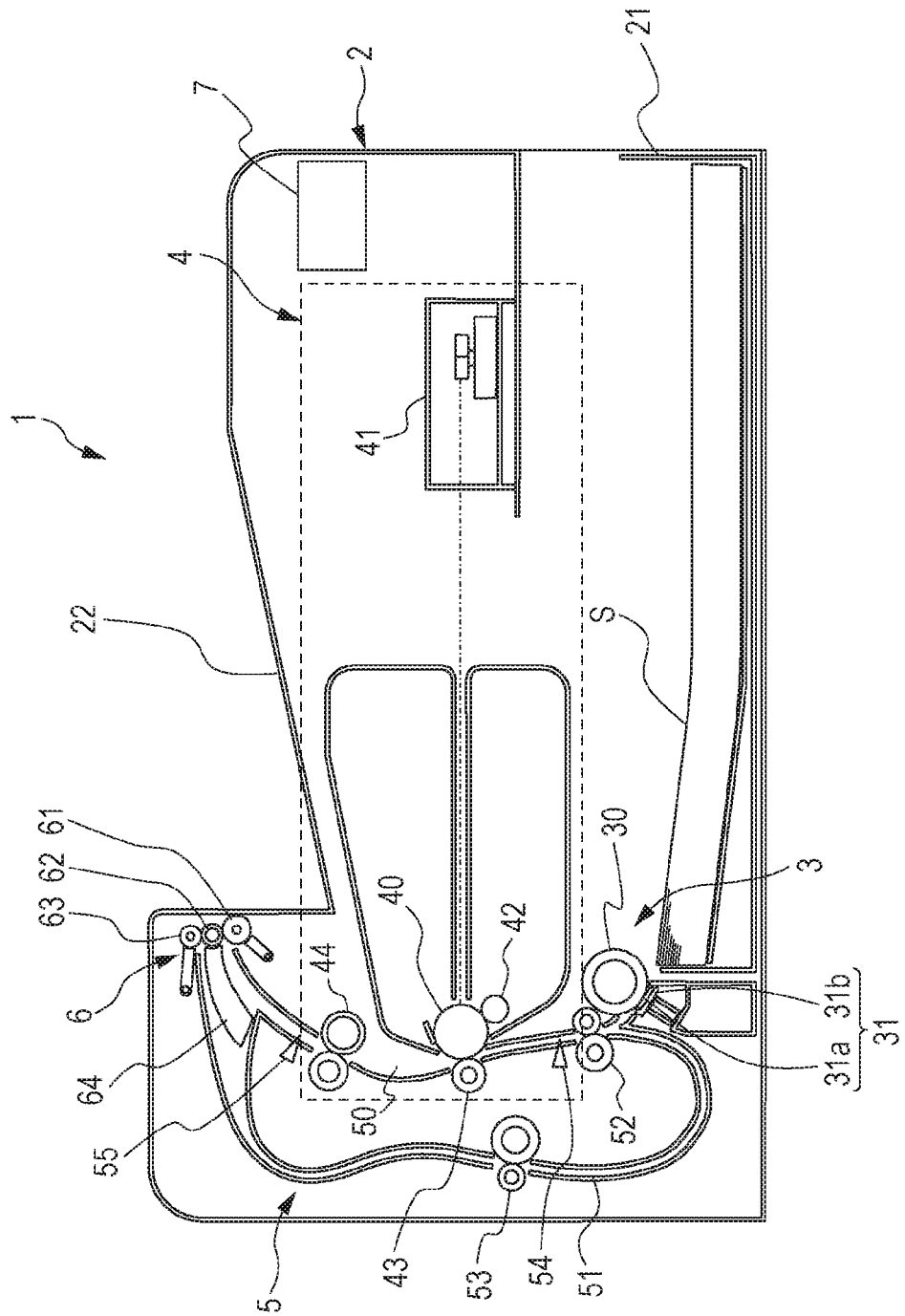
FIG. 1 is a schematic cross-sectional view illustrating an overall configuration of an image forming apparatus according to a first embodiment.

Hereinafter, referring to the drawings, embodiments of the present disclosure will be exemplified in detail. Note that in the embodiments below, an example in which a laser beam printer including a sheet conveying apparatus of the present disclosure is used will be described. Note that the components described in the embodiments below are for exemplification only and the above components do not limit the scope of the present disclosure.

First Embodiment

FIG. 1 is a schematic cross-sectional view illustrating a configuration of an image forming apparatus 1 provided with a sheet conveying apparatus of the present embodiment. As illustrated in FIG. 1, the image forming apparatus 1 includes a main body 2 of the image forming apparatus 1, a feed unit 3, an image forming unit 4, a conveying unit 5, a reversing unit 6, and a control unit 7.

The main body 2 accommodates the feed unit 3, the image forming unit 4, the conveying unit 5, the reversing unit 6, and the control unit 7. A sheet feeding cassette 21 serving as a storage portion is detachably provided upstream of the feed unit 3 in a sheet conveying direction, and feeds sheets S accommodated therein in a stacked manner to the feed unit 3. A sheet discharge tray 22 serving as a stack unit on which the sheets S discharged from the main body 2 after completion of the image formation are stacked is provided downstream of the reversing unit 6 in the sheet conveying direction.

The feed unit 3 includes a feed roller 30, and a separating unit 31 formed of a separating pad 31a and a separating holder 31b that holds the separating pad 31a. The separating pad 31a is in pressure contact with the feed roller 30, and the sheets S accommodated in the sheet feeding cassette 21 are fed to the separating unit 31 with the rotation of the feed roller 30, and is fed to a first conveyance path 50 after being separated sheet by sheet in the separating unit 31.

The image forming unit 4 includes a photosensitive drum 40 serving as an image bearing member, a laser scanner unit 41, a developing unit 42, a transfer roller 43, and as fixing unit 44. An electrostatic latent image is formed on a surface of the photosensitive drum 40 by emitting, on the photosensitive drum 40 that has been uniformly charged by a charging device (not shown), a laser beam from the laser scanner unit 41 based on image information. A toner image is formed on the surface of the photosensitive drum 40 by developing the electrostatic latent image with the developing unit 42. The developed toner image is transferred onto the sheet S with the transfer roller 43, and is fixed to the sheet S by being heated and compressed by the fixing unit 44. An image is formed on the sheet S in the above manner in the image forming unit 4.

Figure 2:
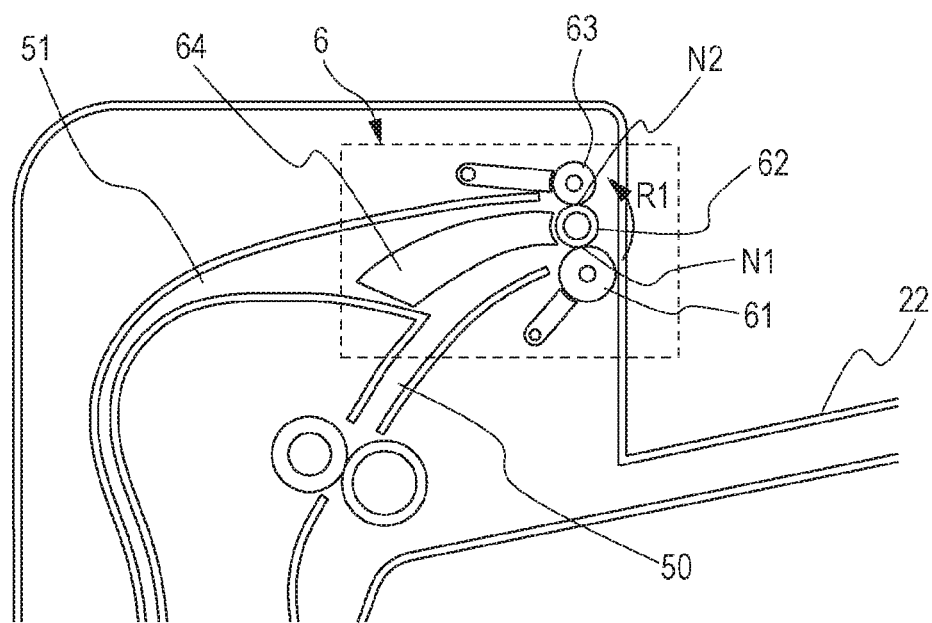
FIG. 2 is a schematic cross-sectional view illustrating a reversing unit according to the first embodiment.

FIG. 2 is a cross-sectional view schematically illustrating a configuration of the reversing unit 6 of the present embodiment. Referring hereinafter to FIG. 2, a configuration of the reversing unit 6 will be described. The reversing unit 6 includes a driving roller 62 (a first rotating member) that receives a driving force from a drive source and that only rotates in one direction (an arrow R1 direction in the drawing), and discharge rollers 61 (second rotating members) and reversing rollers 63 (third rotating members) that follow the rotation of the driving roller 62.

The discharge rollers 61 abutting against the driving roller 62 form first nip portions N1. The discharge rollers 61 together with the driving roller 62 pinch and convey the sheet S in the first nip portions N1. Furthermore, the reversing rollers 63 abutting against the driving roller 62 at positions that are different from the positions of the discharge rollers 61 in a circumferential direction of the driving roller 62 form second nip portions N2. The reversing rollers 63 together with the driving roller 62 pinch and convey the sheet S.

By rotating the driving roller 62, the driving roller 62 and the discharge rollers 61 convey the sheet S from the driving roller 62 towards the sheet discharge tray 22, and the sheet S is discharged through the first nip portions N1. Note that the direction extending from the first nip portions N1 towards the sheet discharge tray 22 in which the sheet S is discharged is referred to as a discharge direction (a first direction). Furthermore, since the driving roller 62 receiving the driving force only rotates in one direction, in the second nip portions N2, the sheet S is conveyed from the sheet discharge tray 22 towards a second conveyance path 51. In other words, in the second nip portions N2, the sheet S is conveyed in a reverse direction (a second direction) that is a direction different from the conveying direction in the first nip portions N1. Note that the second direction is a direction that conveys the sheet S, which has been conveyed towards the sheet discharge tray 22 in the discharge direction, towards the reversing unit 6 side from the sheet discharge tray 22.

In other words, by having the driving roller 62 rotate only in one direction (the arrow R1 direction in the drawing), the sheet S is conveyed in the first direction at the first nip portions N1, and the sheet S is, at the second nip portions N2, conveyed in the second direction that is a direction opposite in the first direction. Furthermore, by having the reversing unit 6 move the driving roller 62, the sheet S is switched from a state in which the sheet S is pinched by the first nip portions N1 to a state in which the sheet S is pinched by the second nip portions N2. The operation of moving the driving roller 62, which switches the pinched state of the sheet S, will be described in detail later.

As illustrated in FIG. 1, the conveying unit 5 includes the first conveyance path 50, the second conveyance path 51, a first pair of conveyance rollers 52, a second pair of conveyance rollers 53, a first sensor 54, and a second sensor 55.

The first conveyance path 50 is a conveyance path that conveys the sheet S to the image forming unit 4 to form, again, an image on the sheet S that has been fed from the sheet feeding cassette 21 or the sheet S that has been conveyed in the reverse direction with the reversing unit 6. In the conveying direction of the sheet S, the downstream side of the first conveyance path 50 is connected to the first nip portions N1 of the reversing unit 6, and the upstream side of the first conveyance path 50 is bifurcated. A first side of the bifurcated first conveyance path 50 is connected to the sheet feeding cassette 21. The sheet S is fed from the sheet feeding cassette 21 to the first conveyance path 50, and a toner image is transferred onto the sheet S in the image forming unit 4 with the transfer roller 43. Furthermore, a second side of the bifurcated first conveyance path 50 is connected to the second conveyance path 51. The second conveyance path 51 is a conveyance path for conveying the sheet S that has been conveyed in the reverse direction with the reversing unit 6 to the first conveyance path 50 once more. In the sheet conveying direction, the upstream side of the second conveyance path 51 is connected to the second nip portions N2 of the reversing unit 6, and the downstream side of the second conveyance path 51 is connected to the second side of the bifurcated first conveyance path 50.

The first pair of conveyance rollers 52 are disposed in the first conveyance path 50, and convey the sheet S fed or conveyed to the first conveyance path 50 along the first conveyance path 50. The second pair of conveyance rollers 53 are disposed in the second conveyance path 51, and convey the sheet S conveyed to the second conveyance path 51 to the first conveyance path 50.

The first sensor 54 is disposed in the first conveyance path 50 at a portion between the feed unit 3 and the image forming unit 4, and detects positions of a front end and a rear end of the sheet S passing the first sensor 54. The second sensor 55 is disposed downstream of the first conveyance path 50 in the sheet conveying direction and, similar to the first sensor 54, is a detection member that detects the positions of the front end and the rear end of the sheet S passing the second sensor 55. The first sensor 54 and the second sensor 55 of the present embodiment include a sensor flag (not shown) that is biased in a direction abutting the sensor flag against the sheet S and that turns the sensor flag when the sheet S passes, and a photo-interrupter (not shown) serving as an optical sensor. In such a configuration, the passing sheet S pushes down and turns the sensor flag, and the sensor flag covering and exposing the detection area of the photo-interrupter allows the front end and the rear end of the sheet to be detected.

Note that in the present embodiment, a sensor provided with a sensor flag that turns when the sheet S passes is used as the first sensor 54 and the second sensor 55; however, the sensor detecting the front end and the rear end of the sheet S is not limited to the above. For example, as the first sensor 54 and the second sensor 55, an optical sensor may be used in which the optical sensor detects the presence of a sheet S by hitting light on the sheet S from a light emitting element and receiving the transmitted light or the reflected light with a light receiving element.

A reverse guide 64 is a guide member that guides the conveyed sheet S. The reverse guide 64 guides the sheet S fed from the sheet feeding cassette 21 to the first nip portions N1, and guides the sheet S conveyed in the second direction at the second nip portions N2 to the second conveyance path 51.

The control unit 7 is capable of controlling the drive of the feed roller 30, the first pair of conveyance rollers 52, the second pair of conveyance rollers 53, and the reversing unit 6, which is a control related to the conveyance of the sheet S, and is capable of controlling the operation related to moving the driving roller 62 in the reversing unit 6. The control of the operation of the reversing unit 6 with the control unit 7 will be described in detail later.

Figure 3A:
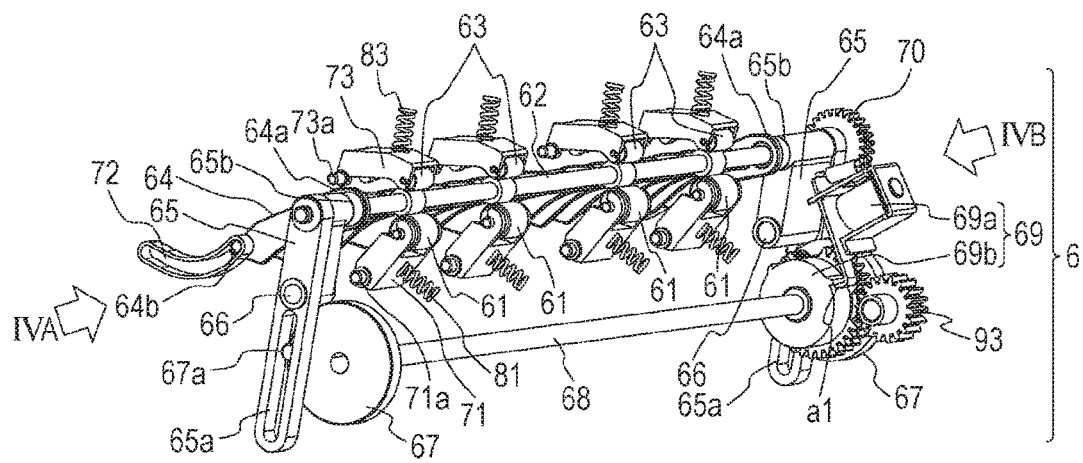
FIGS. 3A and 3B are schematic diagrams illustrating a configuration of the reversing unit according to the first embodiment.
Figure 3B:
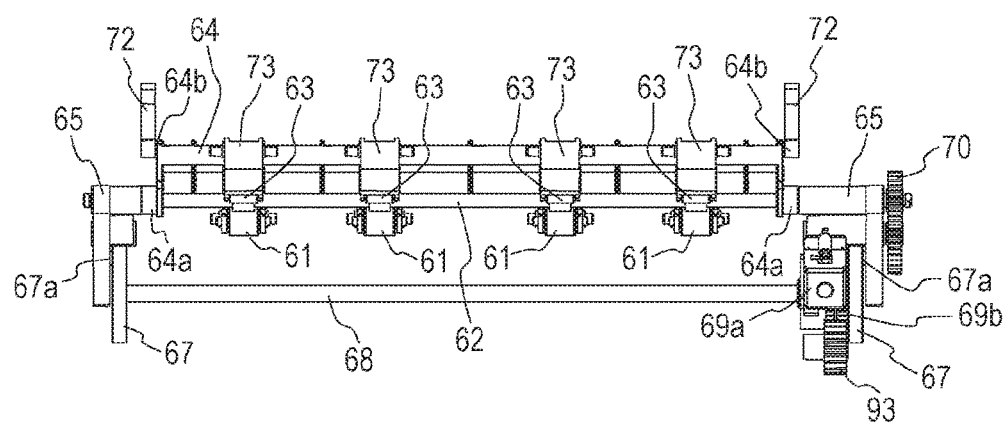
Figure 4A:
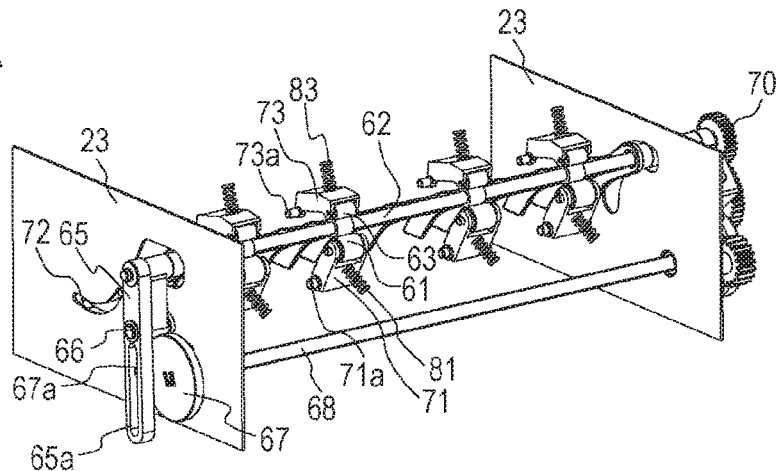
FIGS. 4A to 4C are schematic diagrams illustrating configurations of rotating members in the reversing unit of the first embodiment.
Figure 4B:
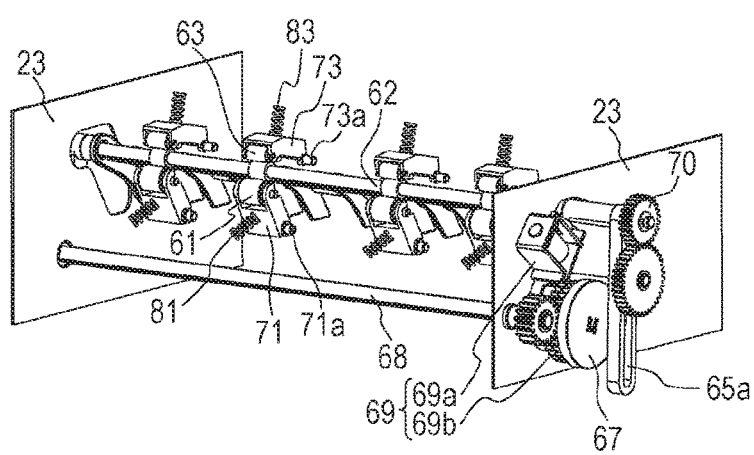
Figure 4C:
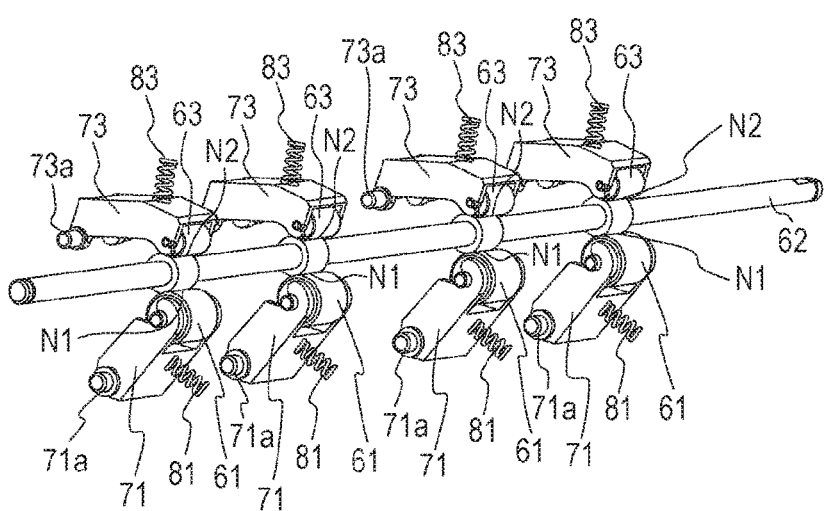

The configuration of the reversing unit 6 of the present embodiment will be described next with reference to FIGS. 3A, 3B, 4A to 4C, 5, and 6. FIG. 3A is a schematic diagram illustrating a configuration of the reversing unit 6 of the present embodiment viewed from the downstream side in the sheet conveying direction, and FIG. 3B is a schematic diagram of the reversing unit 6 in FIG. 3A viewed from obliquely above and on the downstream side in the sheet conveying direction. FIG. 4A and FIG. 4B are schematic diagrams illustrating positional relationships between a frame 23 of the main body 2 and the reversing unit 6 viewed in a IVA direction and a IVB direction, respectively, in FIG. 3A. Furthermore, FIG. 4C is a schematic diagram illustrating a configuration of the discharge rollers 61, the driving roller 62, and the reversing rollers 63 according to the present embodiment.

As illustrated in FIGS. 4A and 4B, in the reversing unit 6, the driving roller 62 is rotatably held by the frame 23 of the main body 2. Furthermore, as illustrated in FIG. 3A, both ends of the driving roller 62 are rotatably held by driving roller holders 65 that are each pivotable about a corresponding fulcrum 66. The driving roller holders 65 each hold the driving roller 62 at a first end side and each driving roller holder 65 is provided with a guide groove 65a at a second end side with the corresponding fulcrum 66 in between.

As illustrated in FIGS. 3A and 3B, the reverse guide 64 is supported by both ends of the driving roller 62 in an axial direction of the driving roller 62, which is a width direction of the conveyed sheet S. Furthermore, first end portions 64a of the reverse guide 64, which is supported by the driving roller 62, in a direction orthogonal to the axial direction of the driving roller 62 are pivotably held by bearings 65b of the driving roller holders 65. Meanwhile, cylindrical protrusions 64b are provided on the second end portions of the reverse guide 64 on the opposite side of the first end portions in the direction orthogonal to the axial direction of the driving roller 62. Note that the protrusions 64b are provided in both end portions of the reverse guide 64 in the axial direction of the driving roller 62 and, as illustrated in FIG. 4A, are fitted to groove portions 72 provided in the frame 23. The groove portions 72 are provided in the frame 23 on both ends side in the axial direction of the driving roller 62.

As illustrated in FIG. 4B, a cam shaft 68 that is provided so as to oppose the driving roller 62 in a substantially parallel manner penetrates the frame 23. Cams 67 are provided at both ends of the cam shaft 68 so as to be rotatable in an integral manner with the cam shaft 68. The cams 67 each include a cylindrical protrusion 67a on a surface different from the surface holding the cam shaft 68. The protrusions 67a fitted in the guide grooves 65a connect the cams 67 and the driving roller holders 65 to each other. Furthermore, a cam drive unit 69 capable of switching the drive operation that rotates the cams 67 is provided on the first end side of the cam shaft 68. The cam drive unit is formed of a solenoid 69a (a switching member) and a partially-toothless gear 69b.

The partially-toothless gear 69b is capable of being rotated by receiving a drive from a drive motor 90 (illustrated in FIG. 6), serving as a drive source, through an input gear 93. The drive operation that rotates the cams 67 is switched in the cam drive unit 69 by engaging a movable piece a1 of the solenoid 69a with a locking portion provided in the partially-toothless gear 69b. Note that in the present embodiment, a configuration including the partially-toothless gear 69b and the movable piece a1 of the solenoid 69a is used as the clutch configuration of the cam drive unit 69; however, not limited to the above, a typical clutch, for example, a spring clutch that uses firmness of the spring may be used.

As illustrated in FIG. 4C, the discharge rollers 61 abutting against the driving roller 62 form the first nip portions N1 and are held by discharge roller holders 71 that are movable about fulcrums 71a. The discharge roller holders 71 are biased against the driving roller 62 with springs 81 (first biasing members) stretched across to the main body 2, and the driving roller 62 forms the first nip portions N1 while being pressed by the discharge rollers 61.

Furthermore, the reversing rollers 63 abutting against the driving roller 62 form the second nip portions N2 and are held by reversing roller holders 73 that are movable about fulcrums 73a. The reversing roller holders 73 are biased against the driving roller 62 with springs 83 (second biasing members) stretched across to the main body 2, and the driving roller 62 forms the second nip portions N2 while being pressed by the reversing rollers 63.

Figure 5:
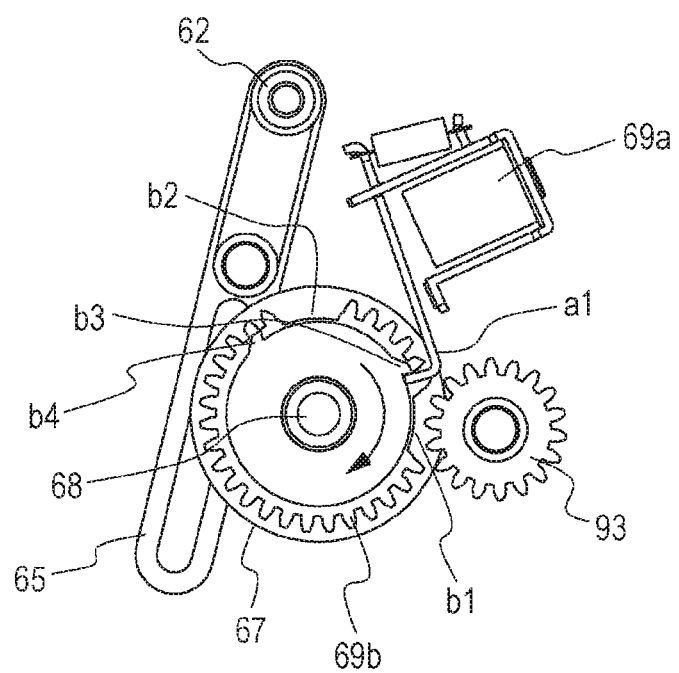
FIG. 5 is a schematic diagram illustrating a configuration of a stopping unit according to the first embodiment.

FIG. 5 is a schematic diagram illustrating a configuration of the cam drive unit 69 serving as a stopping unit. As illustrated in FIG. 5, the partially-toothless gear 69b in the cam drive unit 69 has two toothless portions b1 and b2. With the rotation of the partially-toothless gear 69b, when the toothless portion b1 or the toothless portion b2 reaches the position of the input gear 93, the transmission of the drive from the input gear 93 to the partially-toothless gear 69b is cancelled. In the above, the partially-toothless gear 69b is biased by a biasing unit (not shown) so as to rotate in a direction of the arrow in the figure; however, in a state in which the movable piece a1 of the solenoid 69a is engaged with a locking portion b3 or a locking portion b4, the state in which the rotation is stopped is maintained. On the other hand, when the engagement between the movable piece a1 and the locking portion b3 or the locking portion b4 is released by applying power to the solenoid 69a, the partially-toothless gear 69b that is rotated in the direction of the arrow in the drawing with the biasing unit (not shown) engages with the input gear 93 and drive is transmitted thereto.

Figure 6:
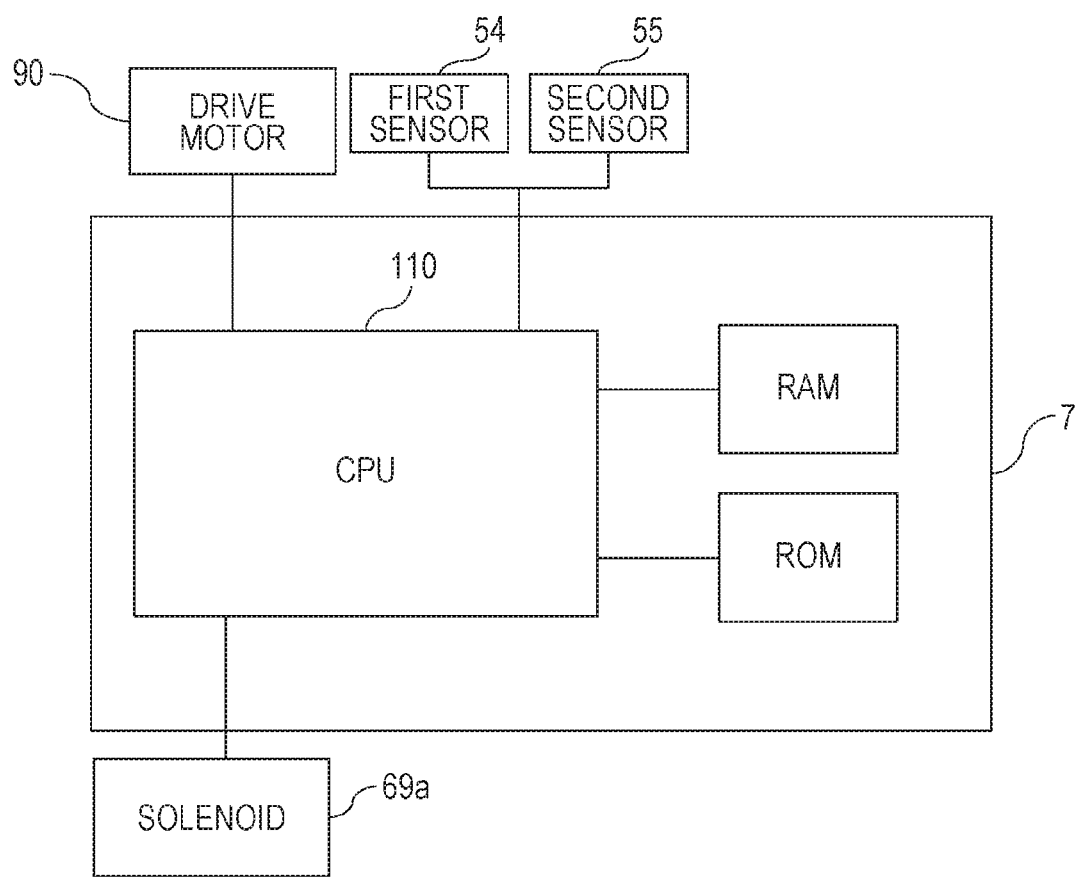
FIG. 6 is a block diagram according to the first embodiment.

A control of the drive according to the present embodiment will be described with reference to the block diagram in FIG. 6. A first end side of the driving roller 62 is connected to a gear 70. Receiving driving force from the drive motor 90 serving as a drive source through the gear 70, the driving roller 62 is rotated. The drive motor 90 rotates only in one direction, and the driving roller 62 rotates only in one direction as well. As illustrated in FIG. 6, a CPU 110 is connected to the drive motor 90, the solenoid 69a, the first sensor 54, and the second sensor 55. Furthermore, the CPU 110 is connected to a ROM and a RAM. By using the RAM as a working memory, a program stored in the ROM is executed. In the present embodiment, the CPU 110, the ROM, and the RAM constitute the control unit 7. Furthermore, in the present embodiment, the rotation of the driving roller 62 and the operation of moving the driving roller 62 with the cam drive unit 69 are performed in the reversing unit 6 by having the control unit 7 control the drive motor 90 and the solenoid 69a.

The operation of moving the driving roller 62 in the reversing unit 6 will be described next with reference to FIGS. 7A to 7C. In the partially-toothless gear 69b of the present embodiment, when the driving roller 62 is positioned in an initial position (a first position), the toothless portion b1 opposes the input gear 93, and when the driving roller 62 is in a retracted position (a second position), the toothless portion b2 opposes the input gear 93. In other words, each time power is applied to the solenoid 69a and the cancelling operation is performed, the position of the driving roller 62 can be switched between the initial position and the retracted position.

Figure 7A:
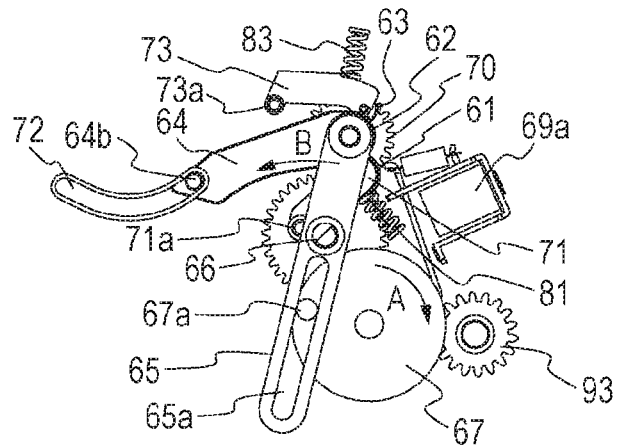
FIGS. 7A to 7C are schematic diagrams illustrating an operation of the reversing unit according to the first embodiment.

FIG. 7A is a schematic diagram of the reversing unit 6 before the operation of moving the driving roller 62 is performed viewed in the axial direction of the driving roller 62. The position of the driving roller 62 in the above case is referred to as the initial position (the first position). The driving roller 62 receiving the driving force from the drive source in the initial position is rotating in only one direction.

In the state in FIG. 7A, the toothless portion b1 of the partially-toothless gear 69b opposes the input gear 93, and the locking portion b3 engages with the movable piece a1 of the solenoid 69a so that the cams 67 do not rotate and the stopped state is maintained. In the above state, when the engagement between the movable piece a1 and the locking portion b3 is released by applying power to the solenoid 69a, drive is transmitted from the input gear 93 to the partially-toothless gear 69b and the cams 67 rotate in a direction of the arrow A (clockwise) illustrated in the drawing. In this state, by having the protrusions 67a fitted in the guide grooves 65a of the driving roller holders 65 rotate in the direction of the arrow A (clockwise) illustrated in the drawing with the rotation of the cams 67, the driving roller holders 65 rotate about the fulcrums 66 in a direction of the arrow B (counterclockwise) illustrated in the drawing. With the above, the driving roller 62, both ends of which are held by the driving roller holders 65, moves in a direction (the arrow B direction in the drawing) away from the discharge rollers 61 and the reversing rollers 63.

Note that since the reverse guide 64 is supported by both ends of the driving roller 62, and the first end portions 64a are held by the driving roller holders 65, the reverse guide 64 moves together with the driving roller 62. Furthermore, since the protrusions 64b of the reverse guide 64 are fitted in the groove portions 72, the reverse guide 64 moves along the groove portions 72 while changing the angle against the driving roller holders 65. In the above state, the gear 70 connected to the first end side of the driving roller 62 moves together with the driving roller 62. While moving as well, the driving roller 62 receiving the driving force from the drive motor 90 (not shown) serving as a drive source rotates in one direction.

Figure 7B:
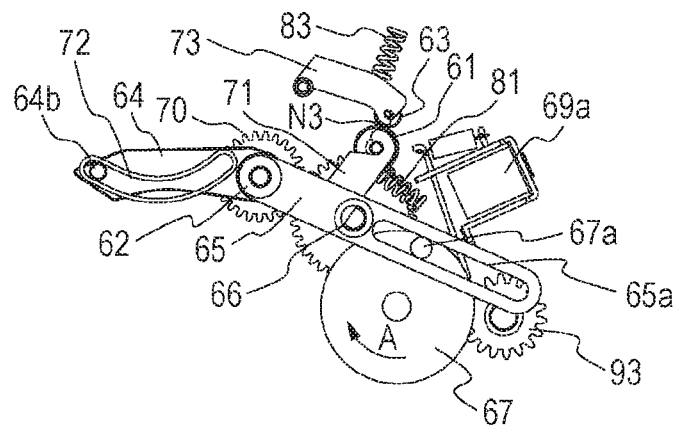

FIG. 7B is a schematic diagram of the reversing unit 6 viewed in the axial direction of the driving roller 62 when the moved amount of the driving roller 62 is the largest after, from the state in FIG. 7A, the driving roller 62 and the reverse guide 64 have been moved with the rotation of the cams 67. In the above state, the driving roller 62 is positioned in the retracted position (the second position) that is a position retracted from the initial position. Furthermore, in the above state, the toothless portion b2 of the partially-toothless gear 69b opposes the input gear 93, and the locking portion b4 engages with the movable piece a1 of the solenoid 69a so that the cams 67 do not rotate and the stopped state is maintained.

The discharge rollers 61 held by the discharge roller holders 71 are biased towards the driving roller 62 with the springs 81 stretched across the discharge roller holders 71 and the main body 2. By moving the driving roller 62 from the initial position to the retracted position, the discharge roller holders 71 rotate about the fulcrums 71a and the discharge rollers 61 move towards the reversing rollers 63.

Furthermore, the reversing rollers 63 held by the reversing roller holders 73 are biased towards the driving roller 62 with the springs 83 stretched across the reversing roller holders 73 and the main body 2. By moving the driving roller 62 from the initial position to the retracted position, the reversing roller holders 73 rotate about the fulcrums 73a and the reversing rollers 63 move towards the discharge rollers 61. Note that the rotation of the discharge roller holders 71 is restricted at the position in FIG. 7B with a restricting member (not shown). Accordingly, the reversing rollers 63 move to positions where the reversing roller 63 abut against the discharge rollers 61 that are stopped at the positions in FIG. 7B. With the above, the reversing rollers 63 and the discharge rollers 61 abut against each other and form third nip portions N3 serving as holding portions capable of pinching and holding the conveyed sheet S.

Figure 7C:
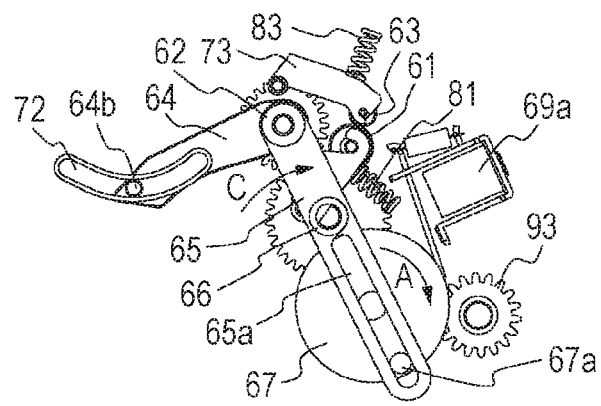

FIG. 7C is a schematic diagram of the reversing unit 6 viewed in the axial direction of the driving roller 62 after, in the state in FIG. 7B, power has been applied once more to the solenoid 69a and the engagement between the movable piece a1 and the toothless portion b2 has been released. In the above state, transmission of the drive to the partially-toothless gear 69b from the input gear 93 rotates the cams 67 and starts the driving roller 62 to move once more.

As illustrated in FIG. 7C, by having the cams 67 rotate in the direction of the arrow A (clockwise) illustrated in the drawing, the driving roller holders 65 rotate about the fulcrums 66 in a direction of the arrow C (clockwise) illustrated in the drawing. With the above, the driving roller 62 approaches the discharge rollers 61 and the reversing rollers 63 and moves from the retracted position towards the initial position. The reverse guide 64 moves along the guide of the groove portions 72. When the protrusions 67a return to the positions in FIG. 7A, the toothless portion b1 of the partially-toothless gear 69b opposes the input gear 93 and the transmission of the drive from the input gear 93 is cancelled. Furthermore, the movable piece a1 of the solenoid 69a and the locking portion b3 of the partially-toothless gear 69b engage with each other and the rotation of the cams 67 is stopped.

As described above, in the present embodiment, a sequential operation, that is, moving the driving roller 62 from the initial position to the retracted position and moving the driving roller 62 from the retracted position to the initial position, is performed by the cam drive unit 69 while the cams 67 rotate once. Furthermore, since the driving roller 62 moves together with the gear 70, during the sequential operation in which the driving roller 62 moves relative to the discharge rollers 61 and the reversing rollers 63, the driving roller 62 receiving the driving force from the drive motor 90 through the gear 70 continues to rotate in one direction.

Referring next to FIGS. 8A to 8D, a conveyance operation of the sheet S during double-side printing with the image forming apparatus 1 including the present embodiment will be described.

Figure 8A:
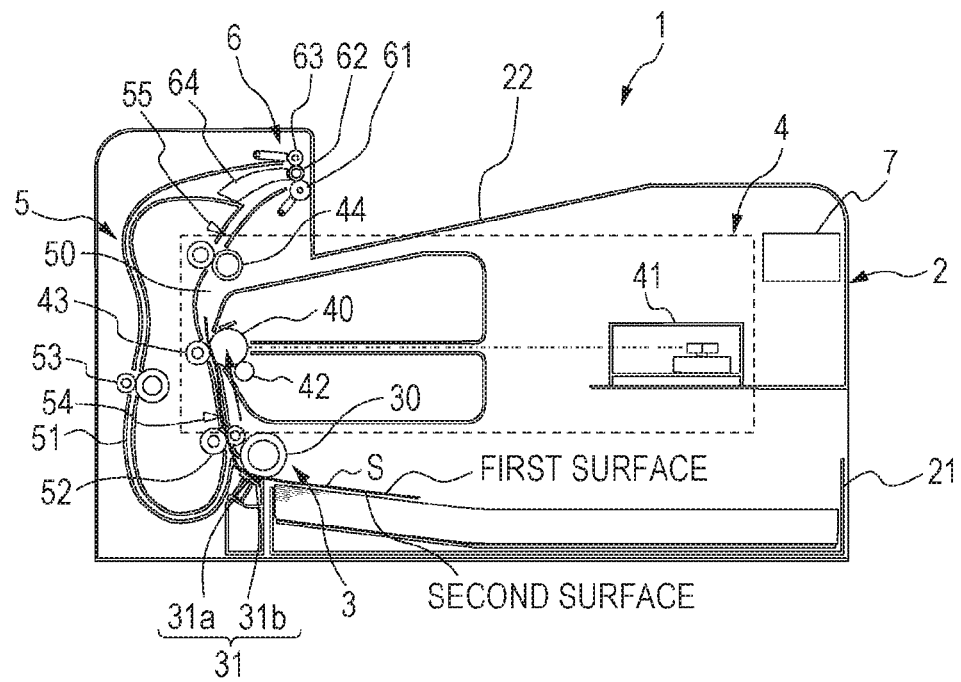
FIGS. 8A to 8D are schematic cross-sectional views illustrating a sheet conveying operation according to the first embodiment when an image is formed on both sides of the sheet.

FIG. 8A is a schematic cross-sectional view illustrating a state after the sheet S accommodated in the sheet feeding cassette 21 has been fed with the feed roller 30. As illustrated in FIG. 8A, the sheets S that have been taken out from the sheet feeding cassette 21 with the feed roller 30 are separated into single sheets in the separating unit 31. The sheet S is then fed to the first conveyance path 50 and is conveyed to the image forming unit 4 with the first pair of conveyance rollers 52. Subsequently, the front end of the sheet S is detected by the first sensor 54, and an image is formed on a first surface of the sheet S in the image forming unit 4 at a timing based on the detection information.

Figure 8B:
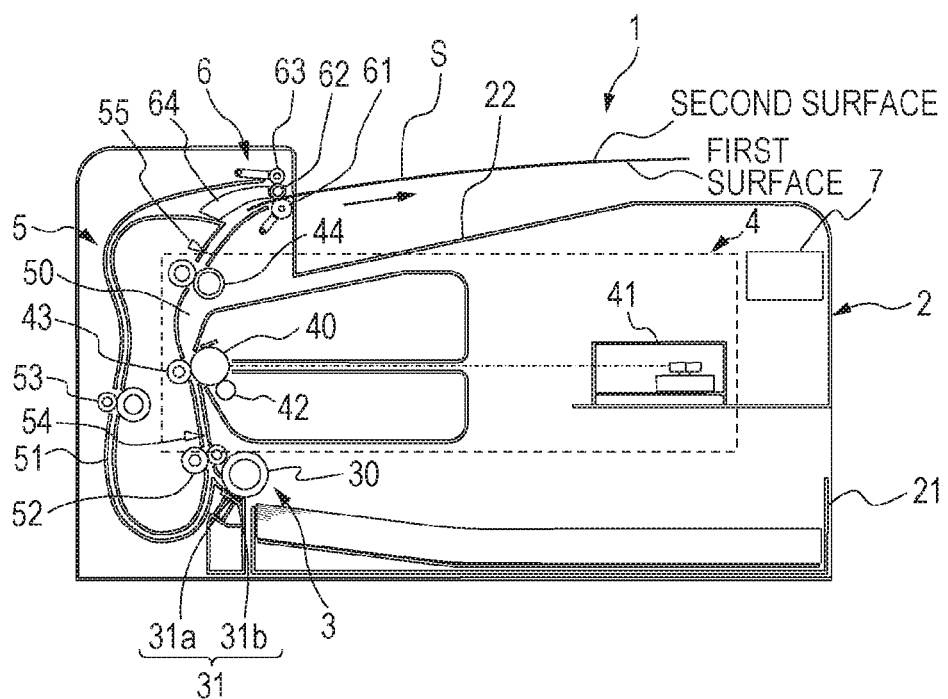

FIG. 8B is a schematic cross-sectional view illustrating a state after the sheet S, on which the image has been formed on the first surface, has been conveyed to the reversing unit 6, and immediately before the operation of moving the driving roller 62 is started. After the toner image transferred on the first surface of the sheet S is fixed in the fixing unit 44, the sheet S is pinched by the first nip portions N1 formed between the driving roller 62 and the discharge rollers 61 and is conveyed in the first direction (the direction of the solid line arrow in the drawing). In the above, the sheet S is conveyed in the first direction while in a state (a first state) in which the first surface of the sheet S is in contact with the discharge rollers 61, and a second surface is in contact with the driving roller 62.

The rear end of the sheet S, the sheet S being in contact with the driving roller 62 and the discharge rollers 61 at the first nip portions N1, is detected by the second sensor 55. Furthermore, based on the detection information, the driving roller 62 starts to move before the rear end of the sheet S has been conveyed by the first nip portions N1. In other words, in the present embodiment, the driving roller 62 starts to move before the rear end of the sheet S completely passes through the first nip portions N1. The sheet S that has been pinched in the first nip portions N1 and that has been conveyed in the first direction is, with the moving of the driving roller 62, pinched in the second nip portions N2. The moving of the driving roller 62 is started by the control unit 7 controlling the solenoid 69a on the basis of the detection information from the second sensor 55. Note that the control unit 7 may control the start of the movement of the driving roller 62 based on the detection information of the front end of the sheet S detected with second sensor 55. The operation of moving the driving roller 62 when switching from the state in which the sheet S is pinched by the first nip portions N1 to the state in which the sheet S is pinched by the second nip portions N2 will be described in detail later referring to FIGS. 9A to 9D.

Figure 8C:
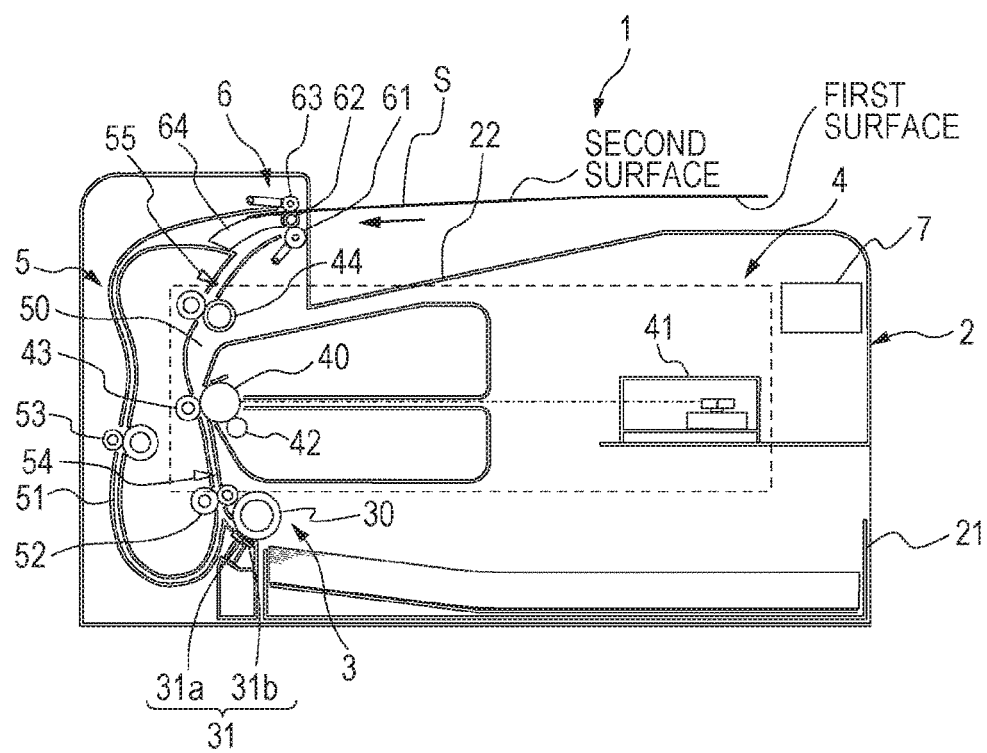

FIG. 8C is a schematic cross-sectional view illustrating a state in which the sheet S is pinched in the second nip portions N2 after the operation of moving the driving roller 62 has been performed. When the sheet S that has been pinched by the first nip portions N1 is pinched by the second nip portions N2 owing to the movement of the driving roller 62, the sheet S is conveyed at the second nip portions N2 in the second direction (the direction of the solid line arrow in the drawing) that is different from the first direction. In the above, the sheet S is conveyed in the second direction while in a state (a second state) in which the second surface of the sheet S is in contact with the reversing rollers 63, and the first surface is in contact with the driving roller 62. With the above, the sheet S that had been conveyed in the first direction in the first nip portions N1 is conveyed in the second direction in the second nip portions N2 and is conveyed to the second conveyance path 51.

Figure 8D:
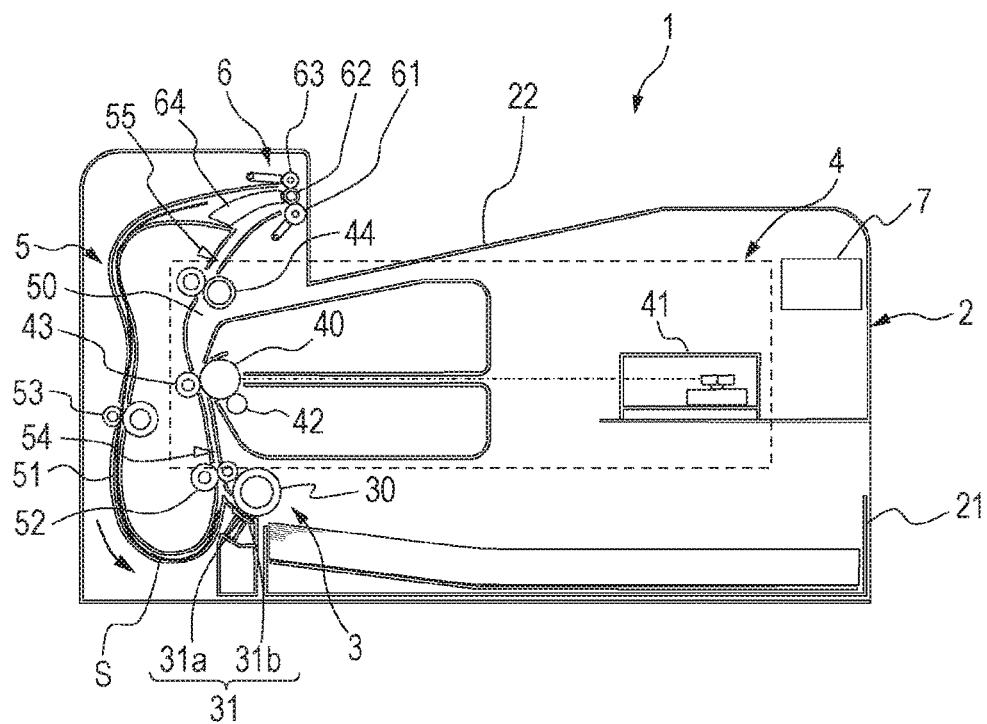

FIG. 8D is a schematic cross-sectional view illustrating a state immediately before the sheet S that has been conveyed in the second direction is conveyed once more to the image forming unit 4. As illustrated in FIG. 8D, the sheet S that has been conveyed to the second conveyance path 51 is conveyed to the first conveyance path 50 with the second pair of conveyance rollers 53. Subsequently, in the image forming unit 4, a toner image is transferred to the second surface of the sheet S with the transfer roller 43. Furthermore, by fixing the toner image formed on the second surface of the sheet S with the fixing unit 44, an image is formed on each of the first surface and the second surface of the sheet S. The sheet S, in which formation of an image has been completed on both surfaces, is conveyed once more to the first nip portions N1 of the reversing unit 6, and is conveyed in the first direction in the first nip portions N1. Subsequently, this time, the driving roller 62 is not moved and the sheet S is discharged through the first nip portions N1 to the sheet discharge tray 22. Formation of an image on both surfaces of the sheet S according to the present embodiment is completed in the above manner.

As described above, in the present embodiment, the driving roller 62 is moved with a switching unit including the driving roller holders 65, the cams 67, the cam shaft 68, and the cam drive unit 69 to switch the pinched state of the sheet S from the first state to the second state.

The operation of moving the driving roller 62 when switching with the switching unit from the state in which the sheet S is pinched by the first nip portions N1 to the state in which the sheet S is pinched by the second nip portions N2 will be described in detail next referring to FIGS. 9A to 9D.

Figure 9A:
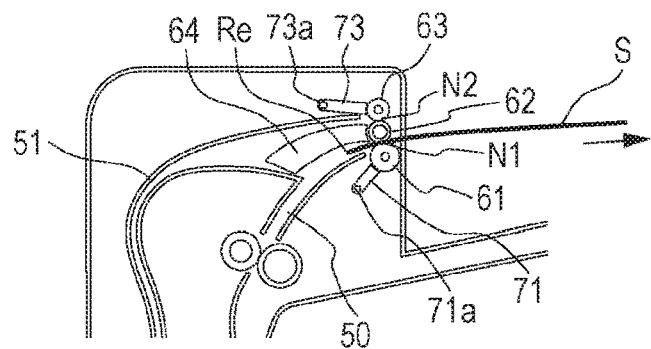
FIGS. 9A to 9D are schematic diagrams illustrating an operation of the reversing unit according to the first embodiment during conveyance of a sheet.

FIG. 9A is a schematic diagram illustrating a state after the sheet S, on which the image has been formed on the first surface, has been conveyed to the first nip portions N1, and immediately before the operation of moving the driving roller 62 is started. In the above state, the driving roller 62 in the initial position (the first position) rotates in one direction. As illustrated in FIG. 9A, the driving roller 62 starts to move in a direction away from the discharge rollers 61 and the reversing rollers 63 when the sheet S is in contact with the driving roller 62 and the discharge rollers 61 and before a rear end Re of the sheet S has been conveyed by the first nip portions N1. Note that as illustrated in FIG. 9A, the rear end Re of the sheet S in the present embodiment refers to a rearmost end portion of the sheet S in the first direction in which the sheet S is conveyed.

Figure 9B:
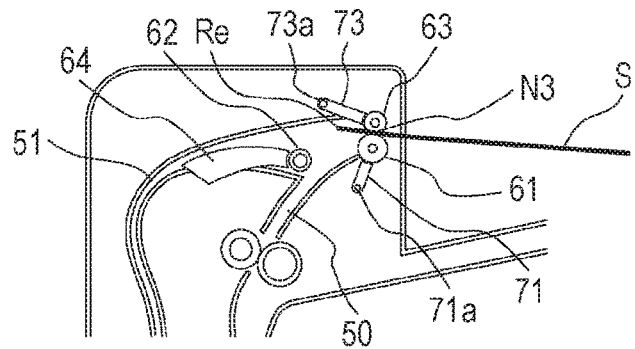

FIG. 9B is a schematic diagram illustrating a state of the sheet S when the driving roller 62 has moved to the retracted position from the initial position by rotating the cams 67 by applying power to the solenoid 69a once. The driving roller 62 moves upstream with respect to the rear end Re of the sheet S, the sheet S being in contact with the driving roller 62 and the discharge rollers 61 in the first nip portions N1, in the conveying direction of the sheet S in the first nip portions N1.

As illustrated in FIG. 9B, when the driving roller 62 moves from the initial position to the retracted position, the first nip portions N1 formed between the driving roller 62 and the discharge rollers 61 are eliminated and the conveyance of the sheet S is temporarily stopped. In the above, the discharge rollers 61 and the reversing rollers 63 form the third nip portions N3, and the sheet S conveyed in the first direction in the first nip portions N1 is pinched in the third nip portions N3 and is held while in a state in which the conveyance of the sheet S is stopped. By pinching the sheet S with the third nip portions N3, the sheet S can be prevented from falling from the reversing unit 6 when the driving roller 62 is moving.

When the driving roller 62 moves to the retracted position, the rear end Re of the sheet S pinched in the third nip portions N3 moves to a position above the discharge roller 61 due to the weight of the sheet S, the stiffness of the sheet S, or the pinched position, the pinched angle, or the like of the sheet S with respect to the third nip portions N3. Accordingly, the rear end Re of the sheet S held by the third nip portions N3 is positioned on the reversing rollers 63 side with respect to the position where the sheet S is in contact with the discharge rollers 61 and the reversing rollers 63. In the above, the driving roller 62 that has moved to the retracted position is positioned below the rear end Re of the sheet S held by the third nip portions N3.

Figure 9C:
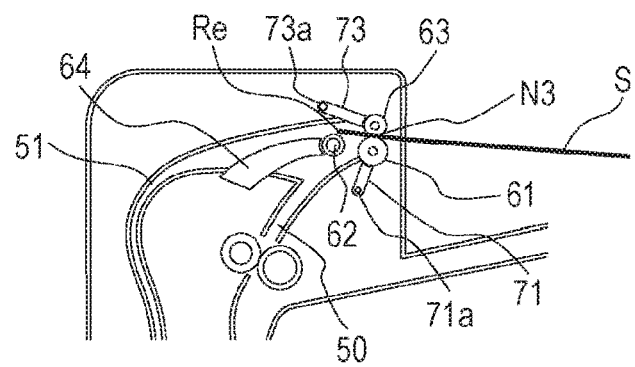

FIG. 9C is a schematic diagram illustrating a state of the sheet S when the driving roller 62 is moving from the retracted position to the initial position. Note that in a state in which the driving roller 62 is positioned in the retracted position, by applying power to the solenoid 69a once again, the cams 67 rotate, and the driving roller 62 starts to move from the retracted position towards the initial position. As illustrated in FIG. 9B, the rear end Re of the sheet S pinched in the third nip portions N3 moves above the discharge rollers 61 due to the weight of the sheet S, the stiffness of the sheet S, or the pinched position, the pinched angle, or the like of the sheet S with respect to the third nip portions N3. In the above state, as illustrated in FIG. 9C, the driving roller 62 approaches the discharge rollers 61 and the reversing rollers 63 from the underside of the sheet S, in other words, from the first surface of the sheet S, pinched by the third nip portions N3. In so doing, the driving roller 62 moves from the retracted position to the initial position while spreading the discharge rollers 61 and the reversing rollers 63 away from each other. With the above, the third nip portions N3 is eliminated, and the first nip portions N1 and the second nip portions N2 are formed again.

Figure 9D:
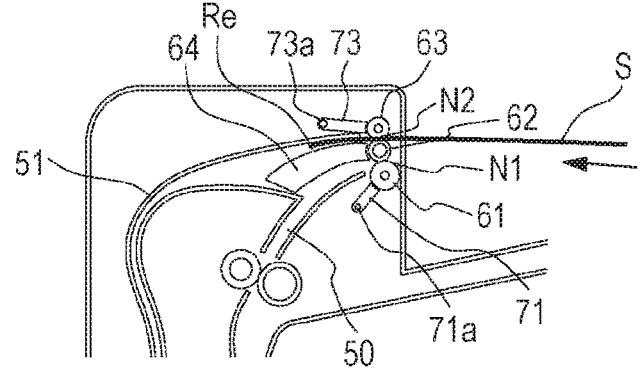

FIG. 9D is a schematic diagram illustrating a state of the sheet S when the driving roller 62 has moved to the initial position. As illustrated in FIG. 9D, the driving roller 62 moves to the initial position from first surface side of the sheet S. When the operation of moving the driving roller 62 is completed, the sheet S that has been held by the discharge rollers 61 and the reversing rollers 63 is pinched by the driving roller 62 and the reversing rollers 63. In other words, the sheet S that has been conveyed in the first direction in the first nip portions N1 is pinched by the second nip portions N2 with the movement of the driving roller 62, and is conveyed in the second direction in the second nip portions N2 with the rotation of the driving roller 62.

As described above, in the present embodiment, the switching unit moves the driving roller 62 before the rear end Re of the sheet S, which is conveyed in the first direction in the first nip portions N1, has been conveyed by the first nip portions. With the above, the nip portion in which the sheet S is pinched can be switched from the first nip portions N1 to the second nip portions N2 and the conveying direction of the sheet S can be changed; accordingly, the sheet S can be reversed.

Moreover, in the present embodiment, by moving the driving roller 62 from the initial position to the retracted position, the conveyed sheet S is held in the third nip portions N3. In other words, the nip portion of the sheet S can be switched from the first nip portions N1 to the second nip portions N2 with the movement of the driving roller 62 without the sheet S being completely discharged from the reversing unit 6. With the above, the conveying direction of the sheet S can be changed without discharging the sheet S from the reversing unit 6.

As described in the Description of the Related Art, as a configuration that changes the conveying direction of the sheet, one can conceive a configuration that, after completely discharging a sheet through a first nip portion in a group of reversing rollers that includes three continuous rollers, conveys the sheet to the second nip portion. In such a configuration, the reversing of the sheet can be performed by providing a switchback portion that temporarily accommodates the sheet at a portion downstream of the group of reversing rollers in the sheet conveying direction. In other words, the sheet that has been completely discharged through the first nip portions is temporarily accommodated on the switchback portion and, subsequently, the sheet is conveyed to the second nip portion from the switchback portion to change the conveying direction of the sheet. However, with such a configuration, a discharge unit for discharging the sheet from inside the image forming apparatus needs to be provided at a position different from where the reversing unit that performs the sheet reversing is positioned, which leads to increase in the size of the apparatus.

Conversely, in the configuration of the present embodiment, the sheet S is not completely discharged through the first nip portions N1 of the reversing unit 6, and by moving the driving roller 62, the nip portion in which the sheet S is pinched is switched from the first nip portions N1 to the second nip portions N2. Accordingly, in the configuration of the present embodiment, a switchback portion that temporarily accommodates the sheet S does not need to be provided. In other words, in the configuration of the present embodiment, the reversing unit 6 can perform reversing of the sheet S and discharging of the sheet S from the main body 2 to the sheet discharge tray 22. With the above, the conveying direction of the sheet S can be changed without increasing the size of the apparatus.

Furthermore, in the present embodiment, the driving roller 62 rotates in only one direction when the sheet S is conveyed. With the above, in the reversing unit 6 of the present embodiment, the rotation direction of the driving roller 62 does not have to be switched to reverse rotation when the sheet S is conveyed in the second direction, and a mechanism to switch the rotation direction of the driving roller 62 is not needed.

Note that the retracted position in which the moved amount of the driving roller 62 is the largest in FIG. 9B is, in the first direction, set upstream with respect to the position of the rear end Re of the sheet S pinched by the driving roller 62 and the discharge rollers 61 in FIG. 9A. By having the driving roller 62 move upstream with respect to the position of the rear end Re of the sheet S, the sheet S will be capable of moving above the position of the discharge rollers 61 with the weight of the sheet S, the stiffness of the sheet S, or the pinched position, the pinched angle, or the like of the sheet S with respect to the third nip portions N3. Moreover, in the above, the driving roller 62 that has moved to the retracted position is positioned below the rear end Re of the sheet S held by the third nip portions N3. With the above, regarding the sheet S that is pinched by the third nip portions N3, the driving roller 62 moves to the initial position from a surface side, the surface side being the side of the sheet S including the surface in contact with the discharge rollers 61, and the sheet S comes in contact with the driving roller 62 and the reversing rollers 63 and is pinched in the second nip portions N2.

Referring next to FIGS. 10A to 10H, a conveyance operation of the sheet S in a case in which an image is formed on both surfaces of two or more sheets in a continuous manner will be described. Note that the first sheet that is fed from the sheet feeding cassette 21 is referred to as a first sheet S1 (a first sheet), and the sheet succeeding the first sheet S1, which is the second sheet, is referred to as a second sheet S2 (a second sheet). Furthermore, same applies hereinafter, and the third sheet is referred to as a third sheet S3, and the fourth sheet is referred to as a fourth sheet S4.

Figure 10A:
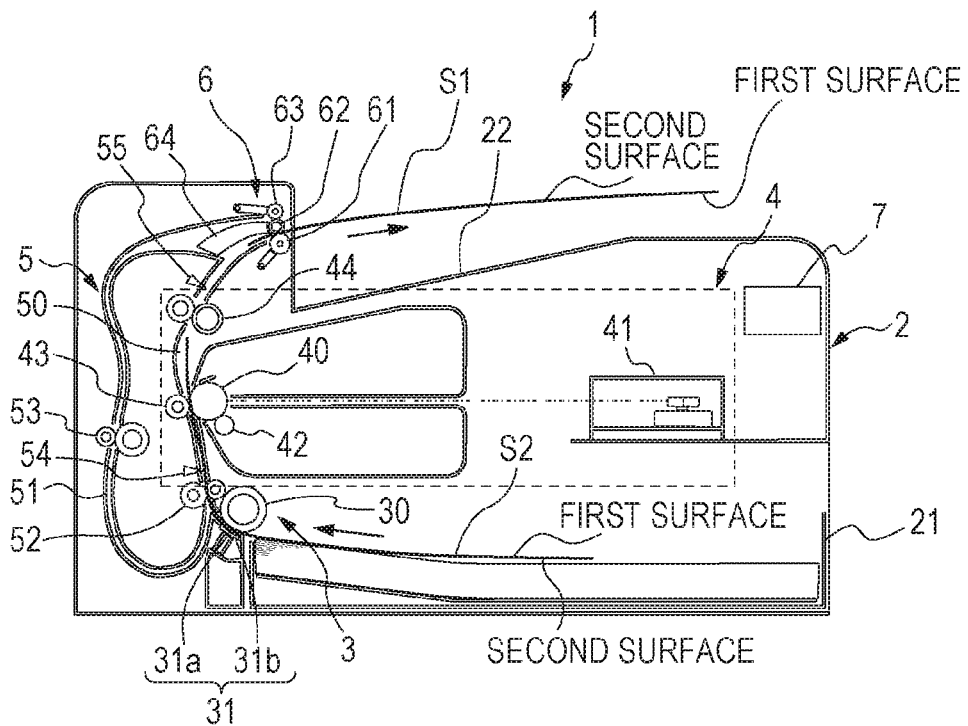
FIGS. 10A to 10H are schematic cross-sectional views illustrating a sheet conveying operation according to the first embodiment when an image is continuously formed on both sides of a plurality of sheets.

FIG. 10A is a schematic cross-sectional view illustrating a state after the formation of an image on the first surface of the first sheet S1 has been completed, and immediately before the first sheet S1 is moved from the first nip portions N1 to the second nip portions N2 with the operation of moving the driving roller 62. In a case in which an image is formed on two or more sheets in a continuous manner, the operation of feeding the second sheet S2 is started after a predetermined interval is formed with the rear end of the first sheet S1. In the present embodiment, when the first sheet S1 moves from the first nip portions N1 to the second nip portions N2 with the operation of moving the driving roller 62, the second sheet S2 is already fed with the feed roller 30, and transfer of a toner image to the first surface is started in the image forming unit 4.

Figure 10B:
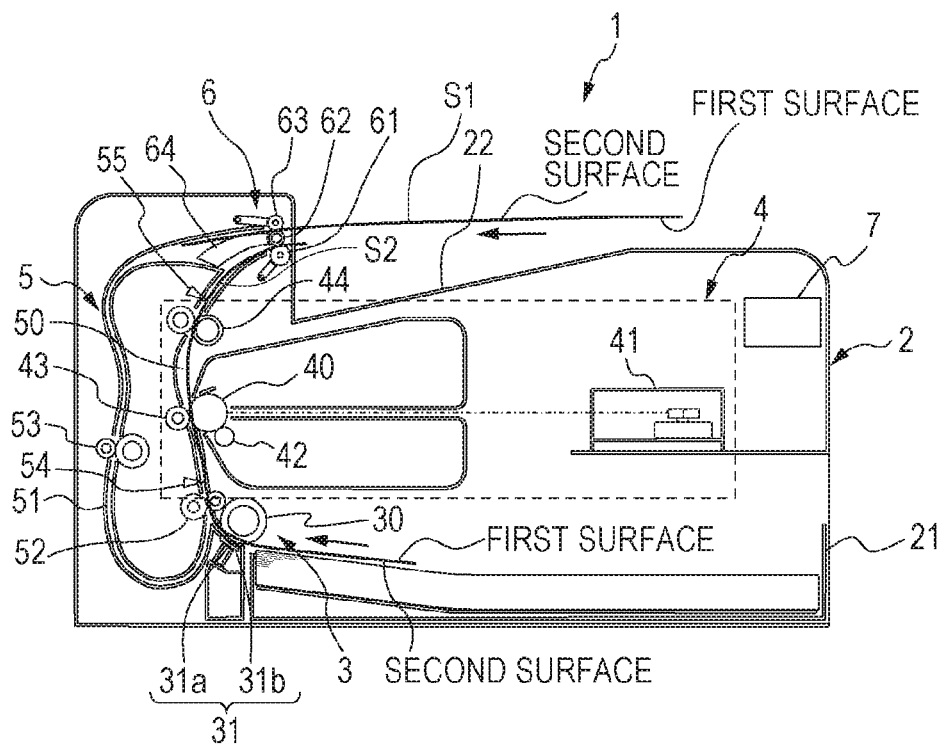

FIG. 10B is a schematic cross-sectional view illustrating a state in which the first sheet S1 is pinched by the second nip portions N2 with the movement of the driving roller 62 and is conveyed in the second direction at the second nip portions N2. When the first sheet S1 that has been pinched in the first nip portions N1 is pinched by the second nip portions N2 with the movement of the driving roller 62, the first sheet S1 is, at the second nip portions N2, conveyed in the second direction towards the second conveyance path 51. As described above, since the first sheet S1 that has been pinched in the first nip portions N1 is pinched by the second nip portions N2 with the movement of the driving roller 62, the first nip portions N1 to which the first sheet S1 has been conveyed can be emptied.

With the above, while the first sheet S1 is conveyed in the second direction, the second sheet S2 that is a succeeding sheet of the first sheet S1 can be conveyed to the first nip portions N1 of the reversing unit 6. The second sheet S2 is conveyed in the first direction in the first nip portions N1. In other words, the first sheet S1 and the second sheet S2 are conveyed in the reversing unit 6 while passing each other (hereinafter, referred to as "cross-conveyed"). In the above, the second surface of the first sheet S1 comes in contact with the reversing rollers 63, and the first surface of the first sheet S1 comes in contact with the driving roller 62. Furthermore, the second surface of the second sheet S2 comes in contact with the driving roller 62, and the first surface of the second sheet S2 comes in contact with the discharge rollers 61.

Figure 10C:
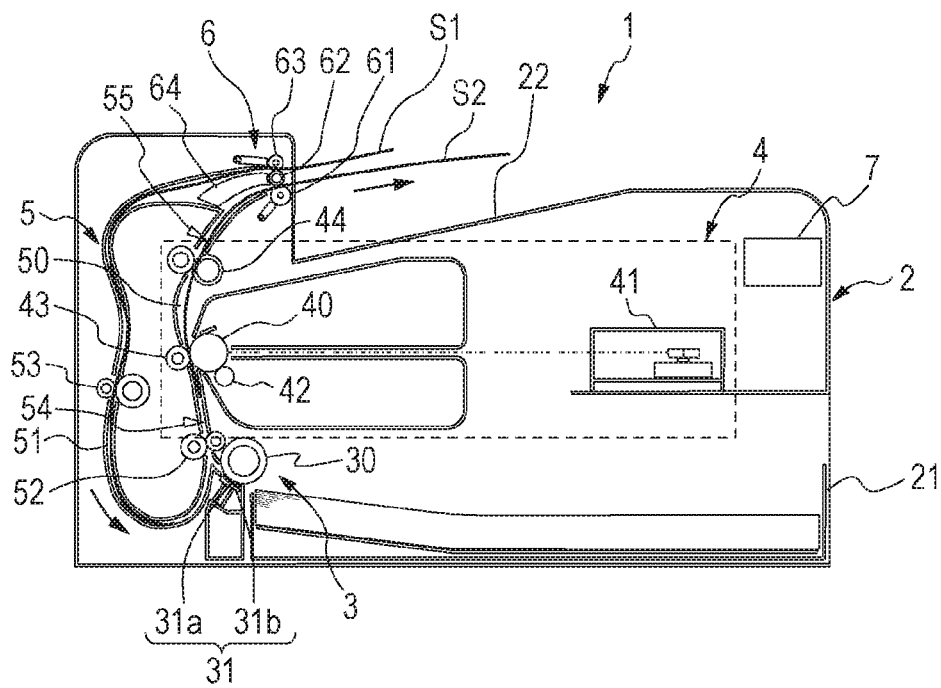

FIG. 10C is a schematic cross-sectional view illustrating a state before the first sheet S1 is conveyed once more to the first conveyance path 50 from the second conveyance path 51. In the state illustrated in FIG. 10C, the second sheet S2 is conveyed in the first direction in the first nip portions N1, and the rear end of the second sheet S2 has already passed the position where the first conveyance path 50 and the second conveyance path 51 meet each other. Accordingly, the first sheet S1 is conveyed once more to the first conveyance path 50 while a set interval is formed with the second sheet S2 without the front end of the first sheet S1 that is a preceding sheet impinging on the rear end of the second sheet S2 that is a succeeding sheet.

Figure 10D:
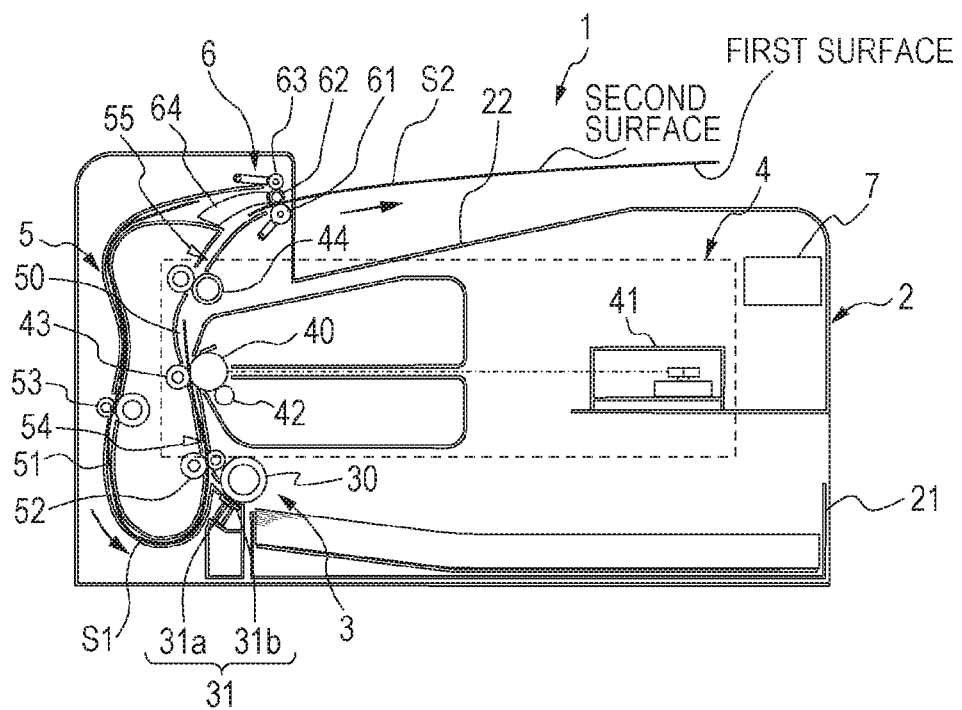

FIG. 10D is a schematic cross-sectional view illustrating a state immediately before the second sheet S2, in which formation of an image on the first surface thereof has been completed, is moved from the first nip portions N1 to the second nip portions N2 with the movement of the driving roller 62. In the above, a toner image is, in the image forming unit 4, transferred to the second surface of the first sheet S1 that has been conveyed once more to the first conveyance path 50 while a set interval is formed with the rear end of the second sheet S2.

Figure 10E:
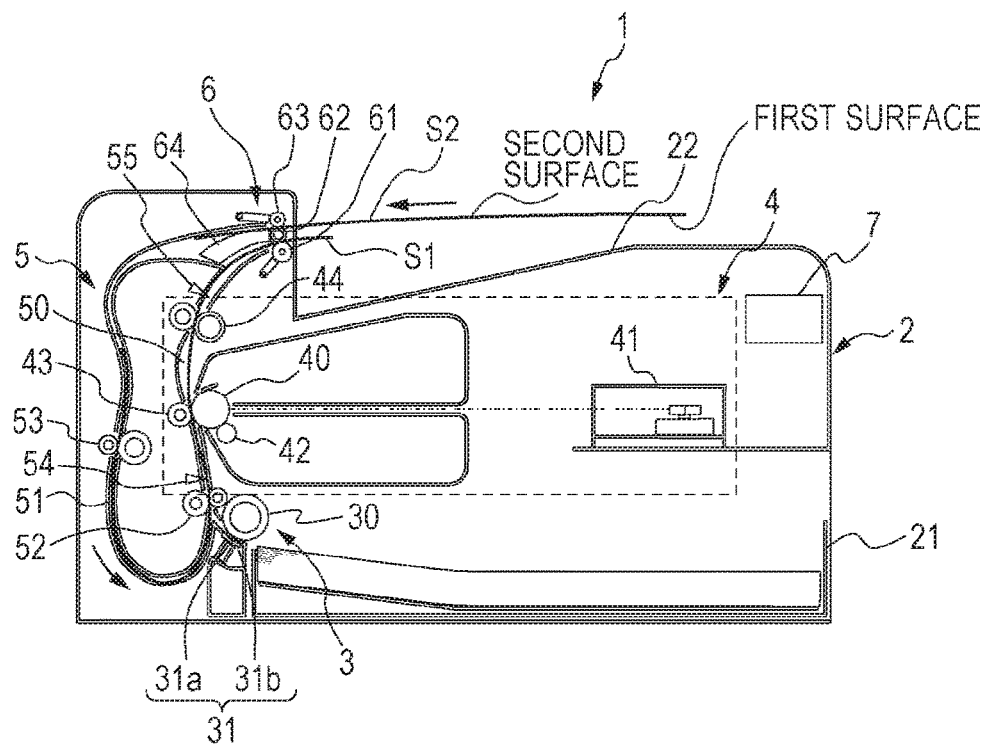

FIG. 10E is a schematic cross-sectional view illustrating a state in which the second sheet S2 is pinched by the second nip portions N2 with the movement of the driving roller 62 and is conveyed in the second direction at the second nip portions N2. In the above, the second sheet S2 that has been pinched in the first nip portions N1 is, at the second nip portions N2, conveyed towards the second conveyance path 51 in the second direction. In the case of the second sheet S2 as well, similar to the first sheet S1, the first nip portions N1 can be emptied by having the second sheet S2 that has been pinched in the first nip portions N1 be pinched by the second nip portions N2 with the movement of the driving roller 62.

With the above, the first sheet S1 on which an image has been formed on the second surface in the image forming unit 4 can be conveyed in the first direction in the first nip portions N1 while the second sheet S2 is conveyed in the second direction. In the above, the second sheet S2 is conveyed in the second direction in the second nip portions N2, and the first sheet S1, on which an image has been formed on both surfaces, is conveyed in the first direction in the first nip portions N1. In other words, the first sheet S1 and the second sheet S2 are cross-conveyed again in the reversing unit 6. In the above, the second surface of the second sheet S2 comes in contact with the reversing rollers 63, and the first surface of the second sheet S2 comes in contact with the driving roller 62. Furthermore, the first surface of the first sheet S1 comes in contact with the driving roller 62, and the second surface of the first sheet S1 comes in contact with the discharge rollers 61.

In the present embodiment, when the conveying direction of the first sheet S1 is changed, the first sheet S1 and the second sheet S2 are cross-conveyed in the reversing unit 6 in the above manner by conveying the second sheet S2 to the reversing unit 6. Moreover, when the second sheet S2 is conveyed in the second direction in the second nip portions N2, by conveying the first sheet S1 on which an image is formed on both the first surface and the second surface to the reversing unit 6, the second sheet S2 and the first sheet S1 are cross-conveyed once again.

Figure 10F:
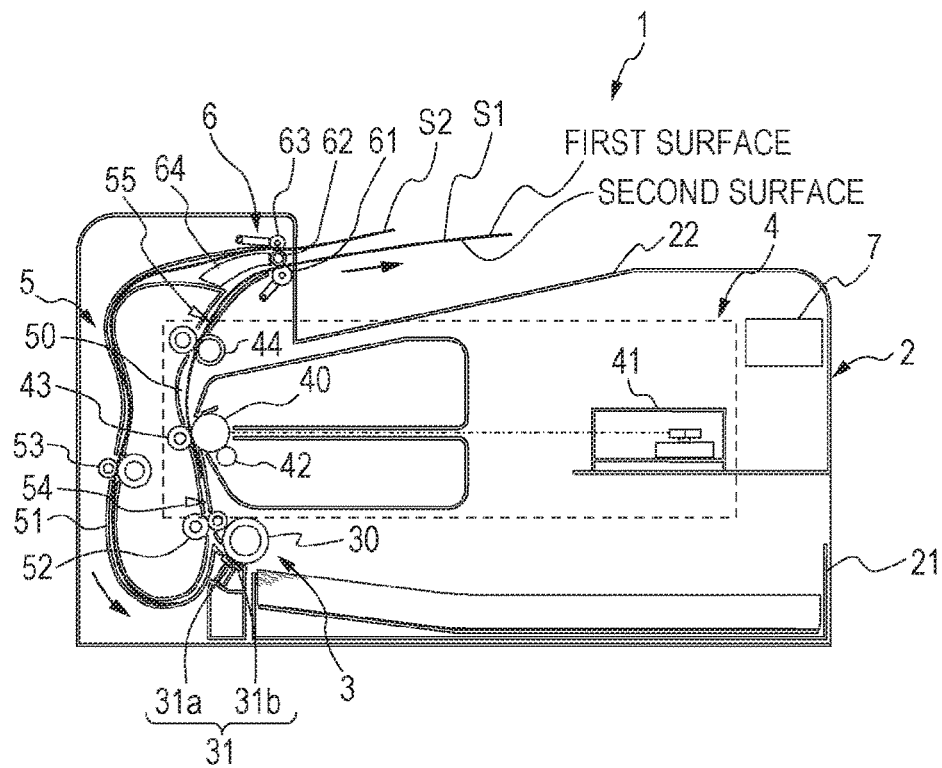

FIG. 10F is a schematic cross-sectional view illustrating a state before the second sheet S2 is conveyed once more from the second conveyance path 51 to the first conveyance path 50. In the above state, the first sheet S1 on which an image has been formed on both surfaces has been conveyed in the first direction in the first nip portions N1, and the rear end of the first sheet S1 has already passed a junction between the first conveyance path 50 and the second conveyance path 51. Accordingly, when the second sheet S2 is conveyed once more to the first conveyance path 50, the rear end of the first sheet S1 and the front end of the second sheet S2 do not impinge on each other. The second sheet S2 is conveyed once more to the first conveyance path 50 while a set interval is formed with the first sheet S1.

Figure 10G:
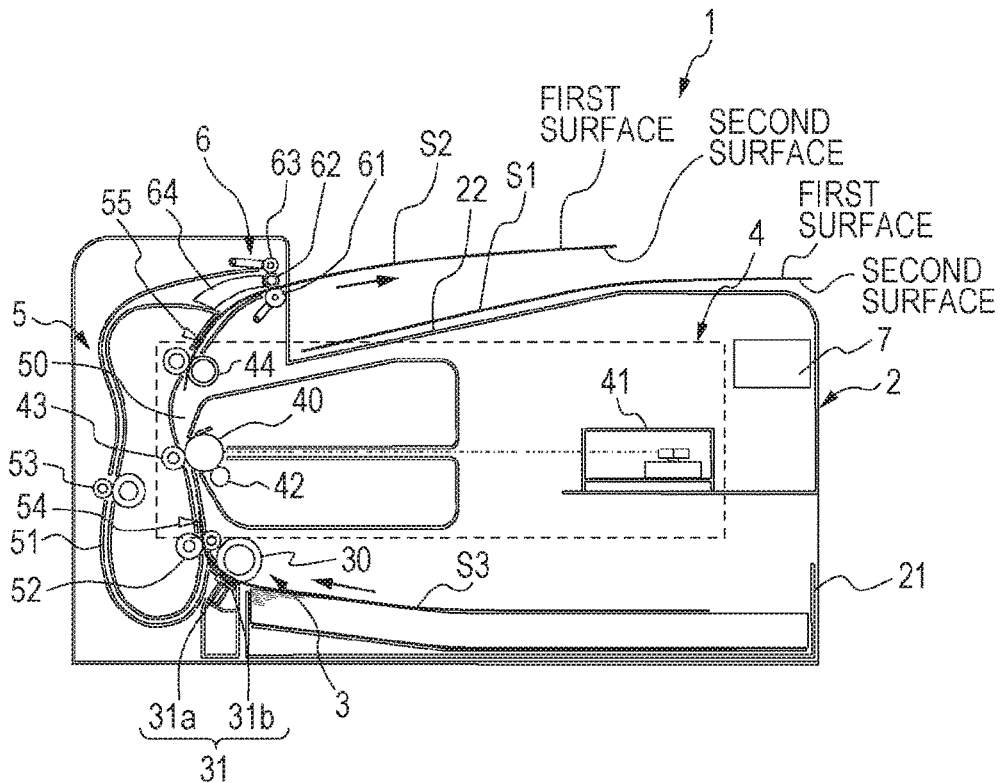

FIG. 10G is a schematic cross-sectional view illustrating a state after the first sheet S1 on which an image is formed on both surfaces is discharged to the sheet discharge tray 22 through the first nip portions N1. The first sheet S1 on which an image is formed on both surfaces is discharged to the sheet discharge tray 22 through the first nip portions N1 and is stacked on the sheet discharge tray 22. In the above, the switching unit does not move the driving roller 62. Furthermore, the second sheet S2 that has been conveyed once more to the first conveyance path 50 and on which an image is formed on both of the first surface and the second surface is, similar to the first sheet S1, conveyed in the first direction in the first nip portions N1. Note that in so doing, the third sheet S3 is fed towards the image forming unit 4 from the sheet feeding cassette 21 while a predetermined interval is formed with the rear end of the second sheet S2.

Figure 10H:
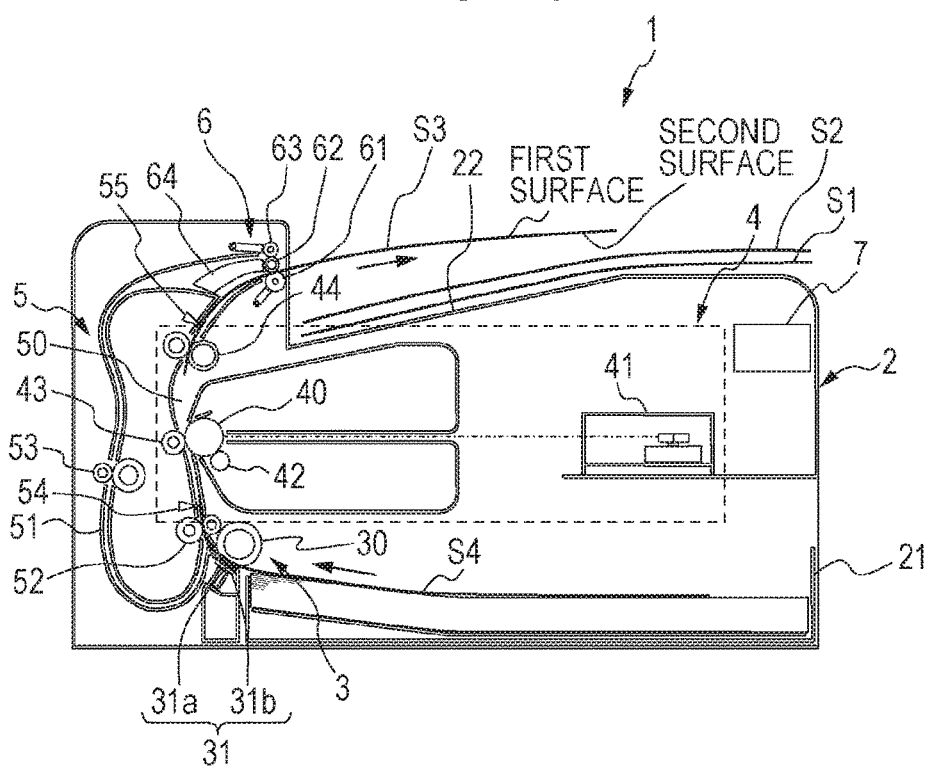

FIG. 10H is a schematic cross-sectional view illustrating a state after the second sheet S2 on which an image is formed on both surfaces is discharged to the sheet discharge tray 22 through the first nip portions N1. Similar to the first sheet S1, the second sheet S2 on which an image has been formed on both sides is discharged to the sheet discharge tray 22 through the first nip portions N1. In the above, the switching unit does not move the driving roller 62. With the above, the first sheet S1 and the second sheet S2 are stacked on the sheet discharge tray 22. Furthermore, the third sheet S3 on which an image has been formed on the first surface is conveyed in the first direction in the first nip portions N1 of the reversing unit 6. Furthermore, in doing so, the fourth sheet S4 is fed towards the image forming unit 4 from the sheet feeding cassette 21 while a predetermined interval is formed with the rear end of the third sheet S3.

Similar to the case of the first sheet S1 and the second sheet S2, the sequential movements in FIGS. 10A to 10H are performed on the third sheet S3 and the fourth sheet S4. Furthermore, the third sheet S3 and the fourth sheet S4, on which an image is formed on both surfaces, are discharged and stacked on the sheet discharge tray 22. In the present embodiment, performing the operation of moving the driving roller 62 in the reversing unit 6 allows efficiently cross-conveying a plurality of sheets S.

Figure 11C:
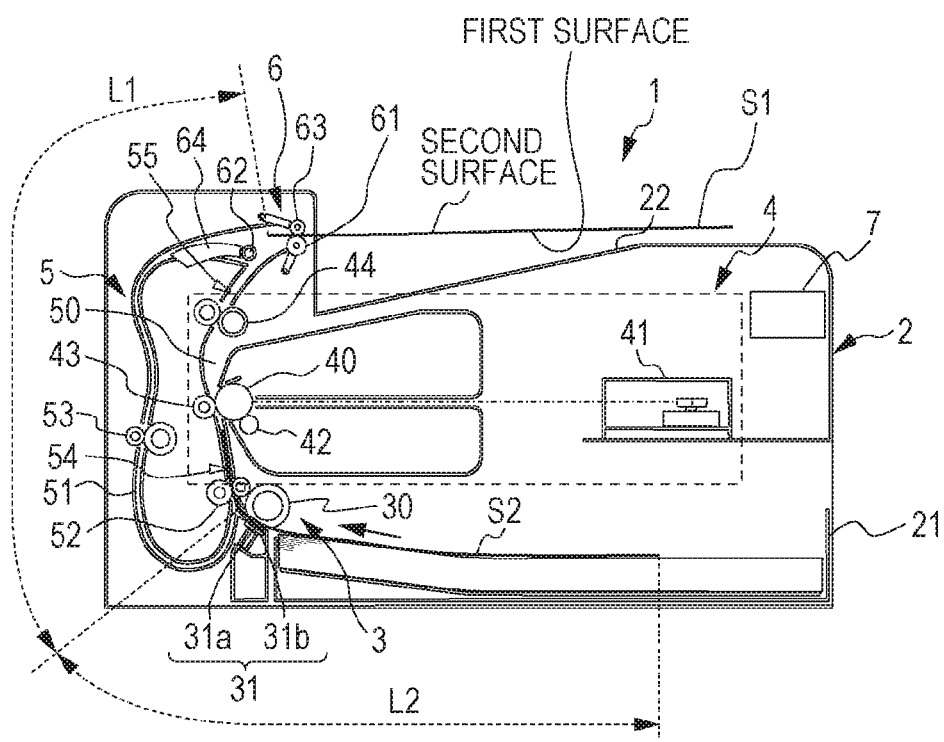

Referring to FIGS. 11A to 11C, a conveyance operation of the sheet S in a case in which the conveyance of the sheet is stopped temporarily in the reversing unit 6 will be described.

FIG. 11A is a schematic cross-sectional view illustrating a state in which the first sheet S1, in which the formation of an image on the first surface has been completed, has been conveyed to the reversing unit, and in which the second sheet S2 has not been fed with the feed roller 30. As illustrated in FIG. 11A, in a case in which the feeding of the second sheet S2 with the feed roller 30 has not been performed at a predetermined timing, compared with the state in FIG. 10A, the interval between the front end of the second sheet S2 and the rear end of the first sheet S1 is large. More specifically, in a case, for example, in which the operation of feeding the second sheet S2 with the feed roller 30 did not succeed with one operation and the second sheet S2 was fed towards the image forming unit 4 after a plurality of feed operations had been repeated, the interval between the front end of the second sheet S2 and the rear end of the first sheet S1 widens.

In a case in which the feeding of the second sheet S2 is delayed and the interval between the first sheet S1 and the second sheet S2 becomes wide, the first sheet S1 that has been conveyed in the second direction in the reversing unit 6 may impinge on the second sheet S2 at a position where the first sheet S1 is conveyed from the second conveyance path 51 to the first conveyance path 50. In order to prevent such a miss-conveyance, the sheet interval between the rear end of the first sheet S1 and the front end of the second sheet S2 needs to be controlled.

Accordingly, as illustrated in FIG. 11B, the present embodiment includes a configuration that stops the driving roller 62 at the retracted position when in a state in which the second sheet S2 has not reached a predetermined position. FIG. 11B is a schematic cross-sectional view illustrating a state in which the driving roller 62 is stopped at the retracted position after moving the driving roller 62 to the retracted position from the initial position with the configuration of the cam drive unit 69. As it has been described in FIGS. 7A and 7B, by applying power to the solenoid 69a for one time and releasing the engagement between the movable piece a1 and the locking portion b3, the cams 67 rotate and the driving roller 62 moves from the initial position to the retracted position. Furthermore, at the timing in which the driving roller 62 reaches the retracted position, by engaging the movable piece a1 and the locking portion b4 together, and by having the input gear 93 and the toothless portion b2 oppose each other, the rotation of the cams 67 is stopped, and the driving roller 62 stops at the retracted position. In the above state, the first sheet S1 is held by the discharge rollers 61 and the reversing rollers 63, and the conveyance of the first sheet S1 stops.

FIG. 11C is a schematic cross-sectional view illustrating a state before the driving roller 62 is moved from the retracted position to the initial position by applying power to the solenoid 69a once more and rotating the cams 67. In the present embodiment, power is applied to the solenoid 69a once more after a predetermined timing has been satisfied from when the front end of the second sheet S2 fed by the feed roller 30 has been detected by the first sensor 54. Note that the predetermined timing is a timing at which the sheet interval between the rear end of the first sheet S1 and the front end of the second sheet S2 is determined to have satisfied a predetermined relationship while the conveyance is stopped. As it has been described in FIGS. 7B and 7C, by applying power to the solenoid 69a once more, the engagement between the movable piece a1 and the locking portion b4 is released, the cams 67 rotate, and the driving roller 62 starts to move from the retracted position to the initial position. As described above, by applying power to the solenoid 69a in accordance with the detection result of the first sensor 54, the sheet interval between the rear end of the first sheet S1 and the front end of the second sheet S2 can be maintained at a predetermine interval at all times.

Note that the timing at which the driving roller 62 is moved from the retracted position to the initial position need to satisfy at least the following condition. In other words, as illustrated in FIG. 11C, a length L2 from a junction between the first conveyance path 50 and an exit side of the second conveyance path 51 to the rear end of the second sheet S2 needs to be shorter than a length L1 from the front end of the first sheet S1 that has stopped being conveyed to the junction between the first conveyance path 50 and the second conveyance path 51. By moving the driving roller 62 and conveying the first sheet S1 after the length L2 has become shorter than the length L1, the first sheet S1 that has passed the second conveyance path 51 and that has reached the first conveyance path 50 can be avoided from impinging on the second sheet S2.

As described above, in the present embodiment, the driving roller 62 can be stopped at the retracted position with the configuration of the cam drive unit 69. Note that since the discharge rollers 61 and the reversing rollers 63 are driven rollers and no drive is input thereto, while the driving roller 62 is stopped at the retracted position, the conveyance of the sheet S that is pinched by the discharge rollers 61 and the reversing rollers 63 stops in the reversing unit 6. The above configuration allows the sheet interval between a preceding sheet S and a succeeding sheet S to be controlled when a plurality of sheets S are conveyed, and the conveying timing of each sheet S can be adjusted.

Note that in order to perform the movements in FIGS. 7A to 7C, in the present embodiment, power is applied twice to the solenoid 69a while the cams 67 rotate once. In other words, power is applied once when the driving roller 62 is moved from the initial position to the retracted position and, subsequently, in order to move the driving roller 62 from the retracted position to the initial position, power is applied once more after the predetermined timing has been satisfied after the first sensor 54 had detected the front end of the second sheet. However, the present disclosure is not limited to the above configuration. For example, after turning the power status of the solenoid 69a to ON, when the first sensor 54 detects the front end of the second sheet S2, the power status is maintained so that the locking portion b4 and the movable piece a1 do not become engaged with each other, and the cam 67 is rotated once without any stoppage in between. On the other hand, after turning the power status of the solenoid 69a to OFF, when the first sensor 54 does not detect the front end of the second sheet S2 within the time the first sensor 54 is to detect the front end of the second sheet S2, the power status of the solenoid 69a is turned OFF. By turning the power status of the solenoid 69a to OFF, the locking portion b4 and the movable piece a1 are engaged with each other and the rotation of the cams 67 is stopped once. With the above, the driving roller 62 is stopped at the retracted position, and after the predetermined timing has been satisfied after the first sensor 54 detected the front end of the second sheet S2, the power status is turned to ON once more, and the driving roller 62 is moved from the retracted position to the initial position.

Furthermore, in the present embodiment, the cam drive unit 69 is configured so that when the driving roller 62 reaches the retracted position, the movement stops; however, the position stopping the driving roller 62 does not have to be the retracted position. By adjusting the positions where the toothless portion b1 and the toothless portion b2 of the partially-toothless gear 69b are provided, and adjusting the positions where the locking portion b3, and the locking portion b4 are provided, the driving roller 62 can be stopped at any position from the initial position to the retracted position while a similar effect as that of the present embodiment is obtained.

As described above, in the present embodiment, by moving the driving roller 62, the sheet S that had been conveyed in the first direction in the first nip portions N1 can be moved to the second nip portions N2 so that the sheet S is conveyed in the second direction. In other words, the sheet S conveyed to the reversing unit 6 can be switched between a state in which the sheet S is pinched by the first nip portions N1 and a state in which the sheet S is pinched by the second nip portions N2 with the operation of moving the driving roller 62. With the above, the first nip portions N1 can be emptied, and the second sheet S2 can be conveyed in the first direction by the first nip portions N1 while the first sheet S1 is conveyed in the second direction by the second nip portions N2 in a case in which an image is formed on both surfaces of a plurality of sheets S. Furthermore, in the case of the second sheet S2 as well, similar to the first sheet S1, the second sheet S2 that has been conveyed in the first direction in the first nip portions N1 can be pinched in the second nip portions N2 and be conveyed in the second direction by moving the driving roller 62. With the above, the first nip portions N1 can be emptied, and the first sheet S1 on which an image has been formed on both surfaces can be conveyed to the first nip portions N1 while the second sheet S2 is conveyed in the second direction. As a result, the first sheet S1 and the second sheet S2 can be cross-conveyed efficiently in the reversing unit 6, and the efficiency in conveying the sheet S can be refined.

Furthermore, in the configuration of the present embodiment, when the first sheet S1 is conveyed in the second direction, the second sheet S2 can be conveyed to the reversing unit 6; accordingly, the conveyance interval between the first sheet S1 and the second sheet S2 can be shortened. The discharge of the second sheet S2 on which an image has been formed on both sides can be performed in a shorter time in proportion to the shortened conveyance interval between the first sheet S1 and the second sheet S2.

Second Embodiment

Figure 12A:
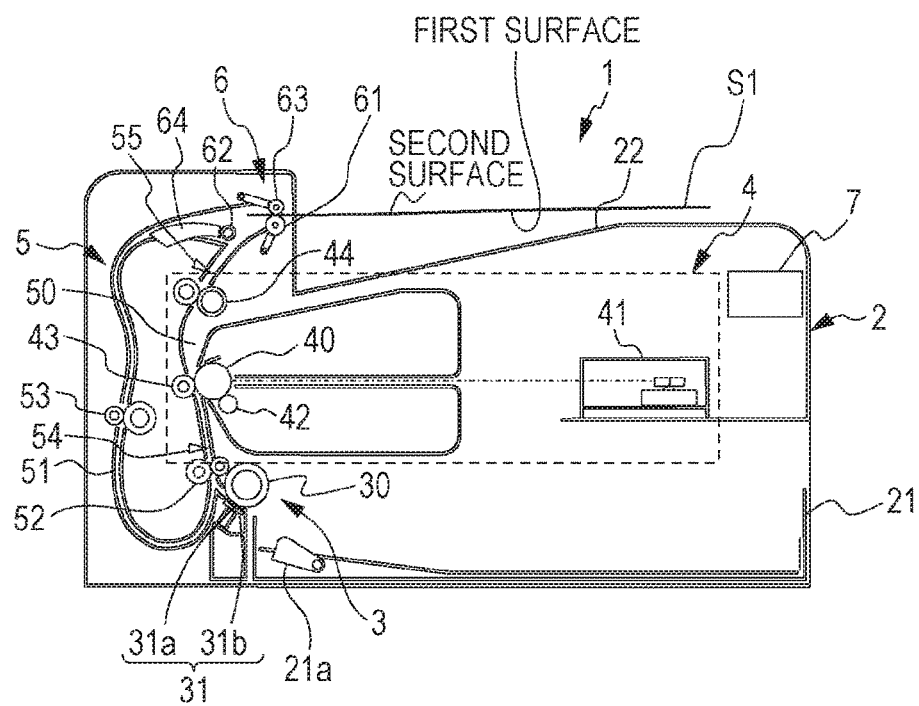
FIGS. 12A to 12C are schematic cross-sectional views illustrating an operation of a reversing unit according to a second embodiment.
Figure 12B:
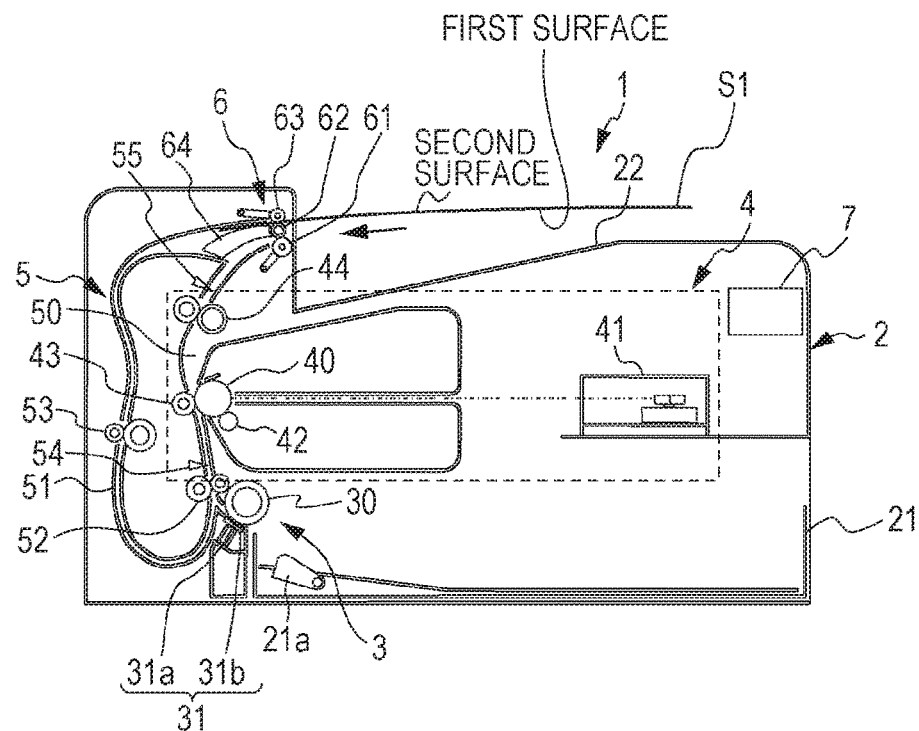

In the first embodiment, a configuration in which the conveyance of the sheet is stopped temporarily when the feeding of the second sheet S2 with the feed roller 30 is not performed at the predetermined timing has been described. Conversely, as illustrated in FIGS. 12A and 12B, a second embodiment is different from the first embodiment in that when the second sheet S2 that is a succeeding sheet of the first sheet S1 is not accommodated in the sheet feeding cassette 21, the conveyance of the sheet is stopped temporarily. Note that in the description hereinafter, members and configurations that are common with those of the first embodiment are denoted with the same reference numerals as those of the first embodiment and description thereof is omitted.

FIG. 12A is a schematic cross-sectional view illustrating a state in the present embodiment in which formation of an image on the first surface of the first sheet S1 has been completed and in which the driving roller 62 has been moved from the initial position to the retracted position by operating the solenoid 69a once. As illustrated in FIG. 12A, in a case in which the sheet inside the sheet feeding cassette 21 has run out after the first sheet S1 has been fed by the feed roller 30, the succeeding sheet is not detected by the first sensor 54 serving as a detection member unless the sheet feeding cassette 21 is refilled with a sheet. Note that in the above, the movement of the driving roller 62 is stopped at the retracted position, and the conveyance of the first sheet S1 held by the discharge rollers 61 and the reversing rollers 63 is stopped.

Accordingly, in the present embodiment, when the first sensor 54 does not detect the succeeding sheet after a predetermined time has passed since the driving roller 62 has stopped at the retracted position, it is determined that the sheet inside the sheet feeding cassette 21 has run out and the conveyance of the first sheet S1 is resumed. FIG. 12B is a schematic cross-sectional view illustrating a state in which, while in a state illustrated in FIG. 12A, the driving roller 62 has been moved to the initial position from the retracted position by applying power to the solenoid 69a once more. As illustrated in FIG. 12B, in a case in which the first sensor 54 does not detect the succeeding sheet after a predetermined time has passed since the driving roller 62 has stopped at the retracted position, the first sheet S1 is conveyed in the second direction with the driving roller 62 and the reversing rollers 63. Moreover, when the first sheet S1 has reached the image forming unit 4, the image to be formed on the first sheet S1 in the image forming unit 4 is changed to an image that is to be formed on the second surface of the first sheet S1. With the above, an image that is intended to be formed on the succeeding sheet is prevented from being formed on the second surface of the first sheet S1.

Subsequently, the first sheet S1 is conveyed to the reversing unit 6 once again, and is discharged onto the sheet discharge tray 22 with the driving roller 62 and the discharge rollers 61. Furthermore, after the first sheet S1 has been discharged, the image forming operation of the succeeding sheet can be started by having a user refill the sheet feeding cassette 21 with a sheet.

Note that as illustrated in FIGS. 12A to 12B, in the present embodiment, a detection sensor 21a that is capable of detecting whether there is a sheet stored in the sheet feeding cassette 21 may be provided. In the above configuration, after an image has been formed on the first sheet S1, when the detection sensor 21a detects that there is no sheet stored in the sheet feeding cassette 21, power is applied to the solenoid 69a once again to move the driving roller 62 from the retracted position to the initial position. In other words, when in a state in which the first sensor 54 does not detect a succeeding sheet, rather than waiting for a predetermined time to pass, the conveyance of the first sheet S1 can be resumed and an image can be formed on both surfaces of the first sheet S1.

Figure 12C:
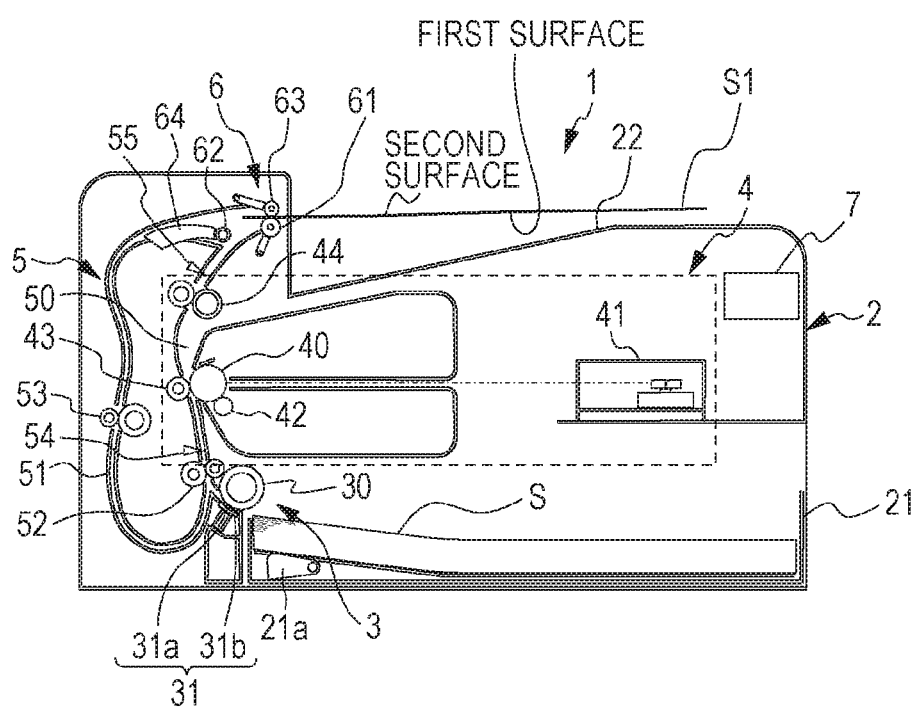

Furthermore, in a case in which the detection sensor 21a is provided, the user may be notified that there are no sheets left when the detection sensor 21a detects that a sheet is not stored in the sheet feeding cassette 21 while the conveyance of the first sheet S1 is stopped. FIG. 12C is a schematic cross-sectional view illustrating a state in which the user has refilled the sheet feeding cassette 21 with sheets when the driving roller 62 has been stopped at the retracted position and the conveyance of the first sheet S1 has been stopped.

In such a case, as illustrated in FIG. 12C, when the detection sensor 21a detects that the sheet feeding cassette 21 has been refilled with sheets, the feed roller 30 starts to feed the succeeding sheet. During the above, the driving roller 62 is kept stopped at the retracted position and the conveyance of the first sheet S1 is stopped. Subsequently, similar to the first embodiment, after the predetermined timing has been satisfied after the first sensor 54 has detected a succeeding sheet, power is applied to the solenoid 69a once again, the driving roller 62 is moved from the retracted position to the initial position, and the conveyance of the first sheet S1 is resumed.

Third Embodiment

In the first embodiment, the configuration of the cam drive unit 69 including the solenoid 69a and the partially-toothless gear 69b is described. In the third embodiment, as illustrated in FIGS. 13A, 13B, and 14A to 14D, the reversing unit 6 including a cam drive unit 200 that has a configuration that is different from that of the first embodiment will be described. Note that the configuration of the present embodiment is similar to that of the first embodiment except for the configuration of the cam drive unit 200; accordingly, common members and configurations will be attached with the same reference numerals and description thereof will be omitted.

Figure 13A:
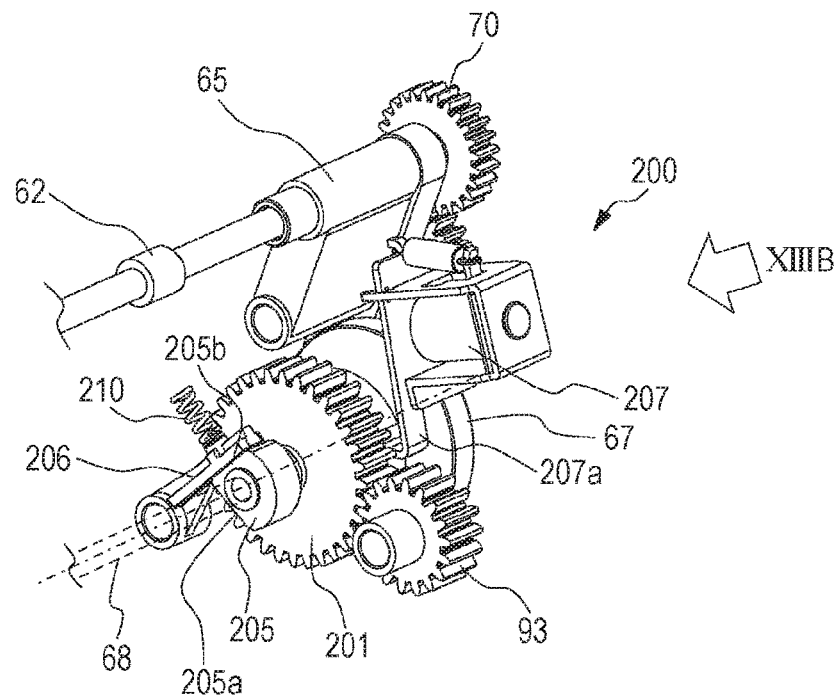
FIGS. 13A and 13B are schematic diagrams illustrating a configuration of a stopping unit according to a third embodiment.
Figure 13B:
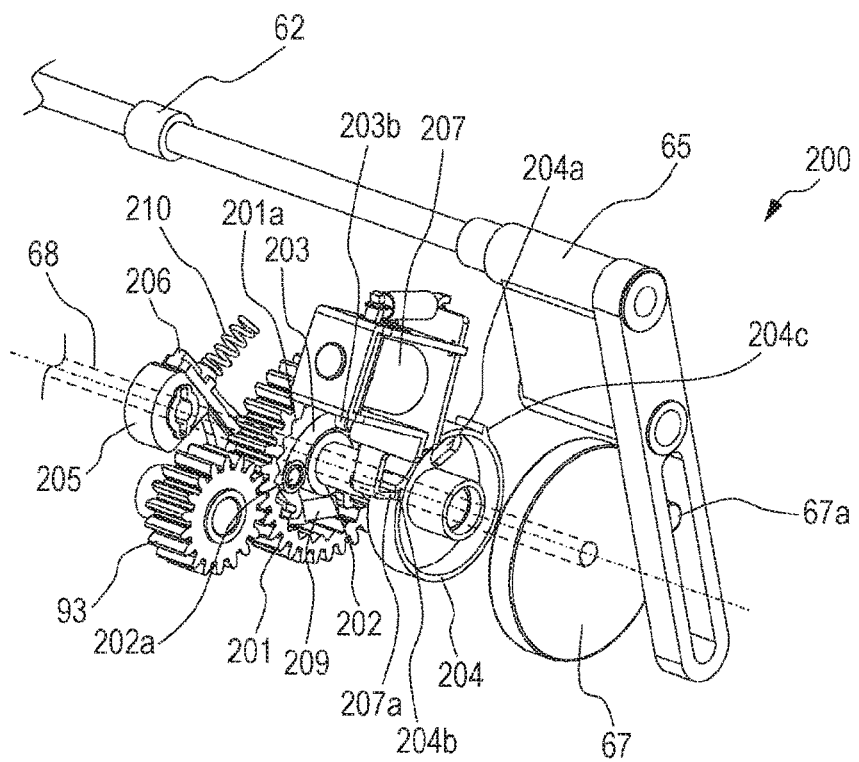

FIG. 13A is a schematic diagram illustrating a configuration of the cam drive unit 200 according to the present embodiment, and FIG. 13B is a schematic diagram of the cam drive unit 200 in a disassembled state viewed in a direction XIIIB in FIG. 13A. Note that in the present embodiment, the driving roller 62 can be moved with a switching unit including the driving roller holders 65, the cams 67, the cam shaft 68, and the cam drive unit 200.

As illustrated in FIGS. 13A and 13B, the cam drive unit 200 serving as a stopping unit includes a drive gear 201, a drive disk 202, a link lever 203, a stopper disk 204, a biasing cam 205, a biasing lever 206, and a solenoid 207.

As illustrated in FIG. 13A, a biasing surface 205a and a biasing surface 205b provided in the biasing cam 205 are configured at angles that allow the biasing surface 205a and the biasing surface 205b to oppose and abut against the pivotal biasing lever 206 that is biased towards the biasing cam 205 with a spring 210.

As illustrated in FIG. 13B, the cams 67, the drive disk 202, and the biasing cam 205 are fixed to the cam shaft 68 in an integrally rotatable state. A cylindrical protrusion 202a is provided on the drive disk 202, and the link lever 203 is pivotably held by the protrusion 202a. The link lever 203 is biased by a spring 209, and an engaging portion 203a of the link lever 203 is, with a biasing force of the spring 209, capable of engaging with a recess 201a provided in an inner peripheral portion of the drive gear 201. Furthermore, a cylindrical protrusion 203b provided on the link lever 203 fits into a slit 204a provided in the stopper disk 204. A locking portion 204b and a locking portion 204c capable of locking the rotation of the stopper disk 204 by engaging with a movable piece 207a provided in the solenoid 207 are provided on an outer peripheral surface of the stopper disk 204.

Referring now to FIGS. 14A to 14D, an operation of the cam drive unit 200 when moving the driving roller 62 will be described. Note that FIGS. 14A to 14D are schematic diagrams of the reversing unit 6 in various states viewed in the axial direction of the driving roller 62.

Figure 14A:
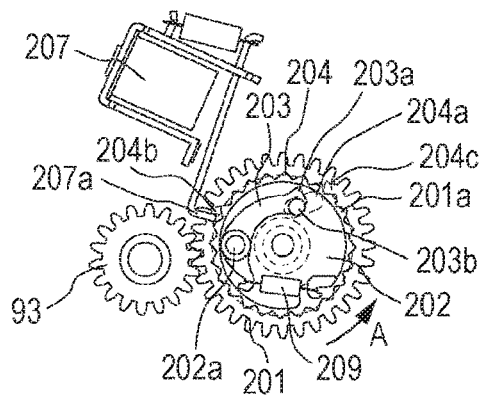
FIGS. 14A to 14D are schematic diagrams illustrating an operation of the reversing unit according to the third embodiment.

FIG. 14A is a schematic diagram illustrating a state of the cam drive unit 200 before power is applied to the solenoid 207 in which the driving roller 62 is positioned at an initial position (a first position) that is capable of conveying the sheet S together with the discharge rollers 61 or the reversing rollers 63. As illustrated in FIG. 14A, in a state in which the movable piece 207a of the solenoid 207 and the locking portion 204b of the stopper disk 204 are engaged with each other, the engaging portion 203a of the link lever 203 is held so as not to be engaged with the recess 201a in an inner peripheral surface of the drive gear 201. In the above, although the drive gear 201 receiving a driving force transmitted from the input gear 93 rotates in the direction of the arrow A illustrated in the drawing, since the engaging portion 203a and the recess 201a are not engaged with each other, the driving force is not transmitted to the cams 67. Furthermore, in the above, the biasing surface 205a of the biasing cam 205 opposes and abuts against the biasing lever 206.

Figure 14B:
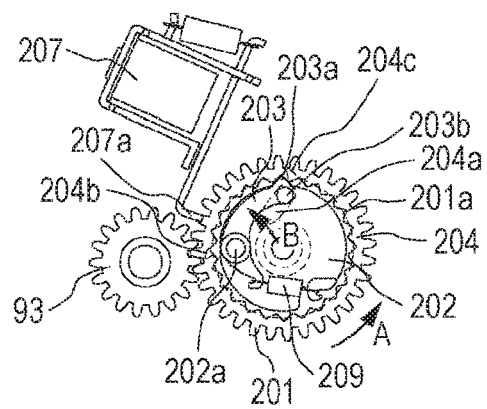

FIG. 14B is a schematic diagram illustrating a state in which power is applied to the solenoid 207 and the engagement between the movable piece 207a and the locking portion 204b is released to release the locking of the stopper disk. In the above state, the link lever 203 pivots in the arrow B direction in the drawing with the biasing force of the spring 209 serving as a tension spring. Furthermore, the protrusion 203b fitted to the slit 204a applying force rotates the stopper disk 204 in the direction of the arrow A illustrated in the drawing.

When the engaging portion 203a engages with the recess 201a provided in the inner peripheral surface of the drive gear 201 with the pivoting of the link lever 203, the link lever 203 held by the protrusion 202a rotates in the direction of the arrow A illustrated in the drawing together with the drive gear 201. With the above, a rotary force is applied to the drive disk 202, and the drive gear 201, the link lever 203, and the drive disk 202 rotate in the direction of the arrow A illustrated in the drawing. In the above, with the rotation of the drive disk 202, the cams 67 are rotated through the cam shaft 68 fixed to the drive disk 202 so as to integrally rotate with the drive disk 202, and the driving roller 62 starts to move from the initial position to a retracted position (a second position).

Figure 14C:
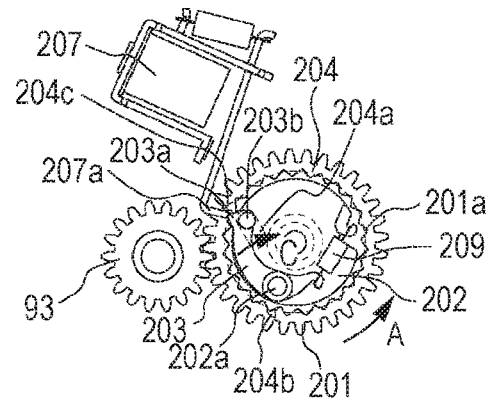

FIG. 14C is a schematic diagram illustrating a state in which the movable piece 207a of the solenoid 207 in which application of power has been cancelled, and the locking portion 204c of the stopper disk 204 are engaged with each other. Due to the engagement between the movable piece 207a and the locking portion 204c, when the stopper disk 204 becomes locked, the protrusion 203b of the link lever 203 rotating together with the drive gear 201 in the direction of the arrow A illustrated in the drawing moves along the slit 204a. With the above, the link lever 203 pivots in the direction of the arrow C direction illustrated in the drawing, and the engagement between the engaging portion 203a of the link lever 203 and the recess 201a in the inner peripheral surface of the drive gear 201 is released; accordingly, the rotation of the drive disk 202 stops. In the above, the rotations of the cam shaft 68 and the cams 67 stop as well, and the driving roller 62 stops moving at the retracted position.

Figure 14D:
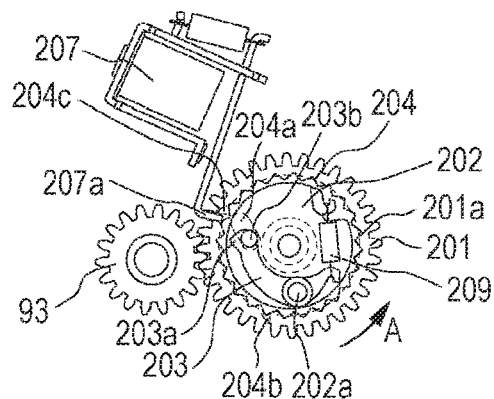

FIG. 14D is a schematic diagram illustrating a state in which the driving roller 62 has stopped moving at the retracted position. In the above, similar to FIG. 14A, since the engagement between the recess 201a of the drive gear 201 and the engaging portion 203a of the link lever 203 is released, the rotary force of the drive gear 201 is not transmitted to the cams 67. In the above state, when power is applied to the solenoid 207 once again, the cams 67 rotate into a state illustrated in FIG. 14A, and the driving roller 62 moves from the retracted position to the initial position.

As described above, similar to the first embodiment, in the configuration of the present embodiment as well, a sequential operation, that is, moving the driving roller 62 from the initial position to the retracted position and moving the driving roller 62 from the retracted position to the initial position, is performed by the cam drive unit 200 while the cams 67 rotate once. Furthermore, the configuration of the cam drive unit 200 allows the movement of the driving roller 62 to be stopped at the predetermined timing.

Figure 15:
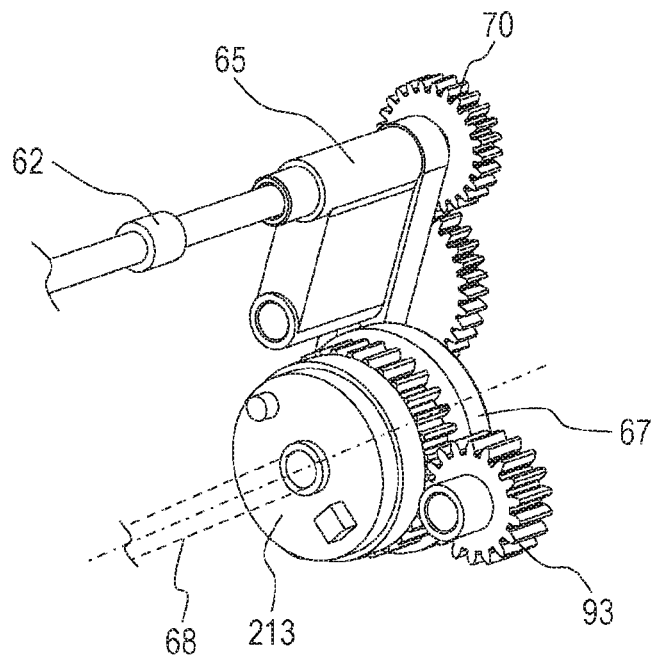
FIG. 15 is a schematic diagram illustrating another configuration of the stopping unit.

FIG. 15 is a diagram schematically illustrating another configuration of the present embodiment. An electrical clutch 213 illustrated in FIG. 15 and a dedicated motor (not shown) may be provided so that the rotation of the cams 67 can be controlled, and the start or the stop of the movement of the driving roller 62 may be controlled at the predetermined timing.

Figure 16:
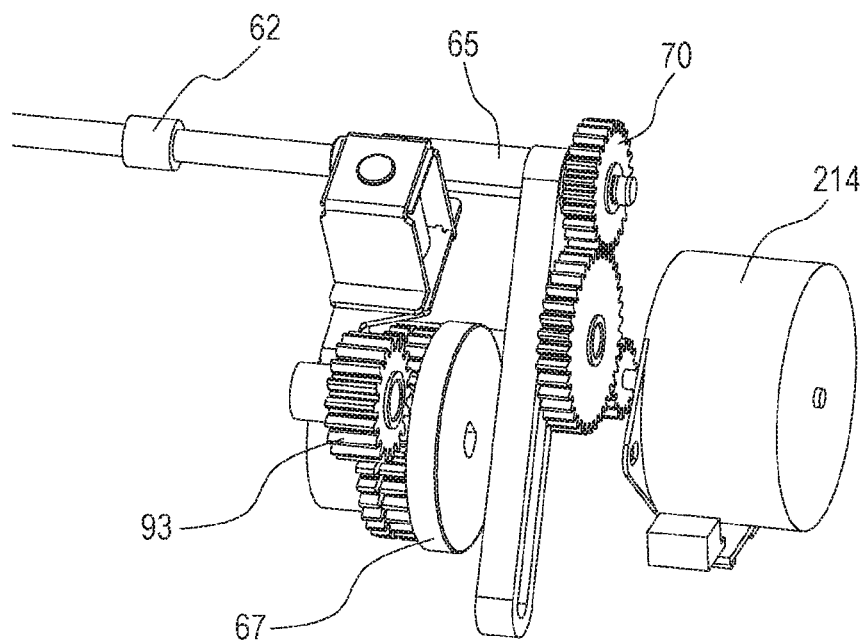
FIG. 16 is a diagram schematically illustrating another configuration of the stopping unit.

Furthermore, in the first to third embodiments, a configuration is described in which when the driving roller 62 moves between the initial position and the retracted position, the driving roller 62 receiving the driving force from the gear 70 continued rotating; however, not limited to the above, the rotation of the driving roller 62 may be stopped. In such a case, as illustrated in FIG. 16, a dedicated motor 214 that transmits the driving force to the driving roller 62 may be provided, and the rotation of the driving roller 62 may be stopped when moving between the initial position and the retracted position or when stopping the movement. FIG. 16 is a diagram schematically illustrating another configuration of the present embodiment. In the above configuration, the rotation of the driving roller 62 can be stopped and the conveyance of the sheet S can be stopped temporarily at a timing when the operation of moving the driving roller 62 is completed and the driving roller 62 has returned to the initial position.

Other Embodiments

Figure 17:
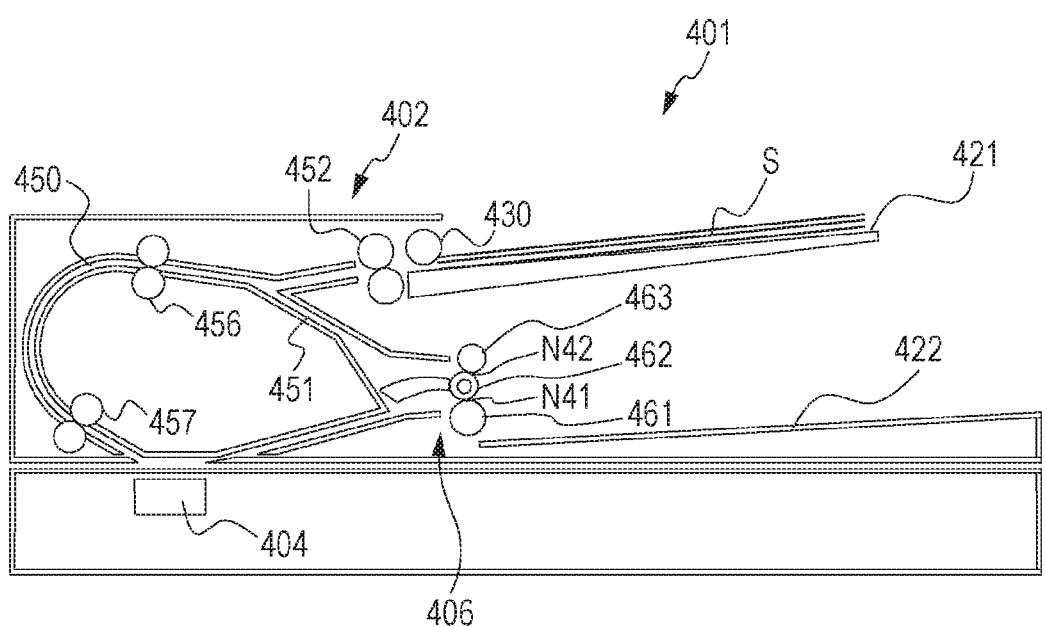
FIG. 17 is a schematic cross-sectional view illustrating a sheet conveying apparatus according to another embodiment.

While the embodiments in which the sheet conveying apparatus is used in an image forming apparatus has been described, the sheet conveying apparatus according to the present disclosure is not limited to the above. The present disclosure can be used in any apparatus that changes the conveying direction of the sheet S from the first conveying direction to the second conveying direction, and an effect similar to that of the embodiments of the present disclosure can be obtained with such an apparatus. In other words, as illustrated in FIG. 17, the present disclosure can be applied to an image reading apparatus that reads an image on the conveyed sheet S, and a similar effect can be obtained with the image reading apparatus.

An image reading apparatus 401 that is a sheet conveying apparatus according to the present embodiment includes an image reading unit 404 that reads an image on the conveyed sheet S. Note that a configuration of a reversing unit 406 according to the present embodiment is similar to that of the first embodiment. Accordingly, the points of the configuration of the image reading apparatus 401 and points of the method of reading images on both surfaces of the sheet S that are different from those of the first embodiment will be described mainly, and description of the points that are similar to those of the first embodiment will be omitted.

The sheets S that are stored in a sheet feed tray 421 serving as a storage portion are fed by the rotation of a feed roller 430, and are separated into singe sheets with a separation unit 452. Subsequently, the sheet S is conveyed to the image reading unit 404 through a first conveyance path 450 with pairs of conveyance rollers 456 and 457, and an image on a first surface of the sheet S is read with the image reading unit 404. The sheet S having been read the image on the first surface is conveyed to the reversing unit 406, and is pinched in a first nip portion N41 formed between a driving roller 462 (a first rotating member) and a discharge roller 461 (a second rotating member). By the rotation of the driving roller 462, the sheet S pinched by the driving roller 462 and the discharge roller 461 is conveyed from the driving roller 462 towards a sheet discharge tray 422 serving as a stack unit, and is conveyed in a direction (a first direction) that is a direction in which the sheet S is discharged from the apparatus main body 402. Subsequently, the driving roller 462 starts to move before the rear end of the sheet S is conveyed to the sheet discharge tray 422 with the driving roller 462 and the discharge roller 461.

With the movement of the driving roller 462, the sheet S that had been pinched by the first nip portion N41 is pinched at a second nip portion N42 formed by the driving roller 462 and a reversing roller 463 (third rotating member), and is conveyed in a direction (a second direction) extending from the sheet discharge tray 422 towards a second conveyance path 451. Subsequently, the sheet S is conveyed once more to the image reading unit 404 through the first conveyance path 450 with the pairs of conveyance rollers 456 and 457, and an image on a second surface of the sheet S is read with the image reading unit 404. The sheet S having been read the image on both the first surface and the second surface is conveyed to the first nip portion N41 once again, and is discharged to the sheet discharge tray 422 after being conveyed in the first direction in the first nip portion N41.

As described above, in the present embodiment as well, by moving the driving roller 462 of the reversing unit 406, the sheet S that had been pinched in the first nip portion N41 can be pinched in the second nip portion N42 without completely discharging the sheet S from the reversing unit 406. Similar to the reversing unit 6 of the first embodiment, the reversing unit 406 includes a switching unit that switches between the pinched states of the sheet S. Accordingly, the reversing unit 406 is capable of switching the nip portion in which the sheet S is pinched from the first nip portion N41 to the second nip portion N42 before the rear end of the sheet S conveyed in the first direction has been conveyed by the first nip portion N41. As described above, the present disclosure can be applied to the image reading apparatus that reads an image on the conveyed sheet S, and an effect that is similar to that of the first embodiment can be obtained with the image reading apparatus.

Moreover, while in the embodiments described above, examples in which the present disclosure is applied to an electrophotographic image forming apparatus has been given, the present disclosure is not limited to the above. For example, the present disclosure may be applied to image forming apparatuses other than electrophotographic image forming apparatuses, such as ink jet image forming apparatuses.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-084781 filed Apr. 21, 2017, which is hereby incorporated by reference herein in its entirety.

What is claimed is:

1. A sheet conveying apparatus comprising:
   a first rotating member configured to rotate in one direction;
   a second rotating member configured to convey, together with the first rotating member, a sheet in a first direction upon rotation of the first rotating member;
   a third rotating member configured to convey, together with the first rotating member, the sheet in a second direction upon rotation of the first rotating member, wherein the second direction is a direction different from the first direction; and
   a switching unit configured to switch a position of the first rotating member between a first position at which the first rotating member conveys the sheet with the second rotating member or the third rotating member, and a second position at which the first rotating member is retracted relative to the first position,
   wherein, before a rear end of the sheet conveyed in the first direction has been conveyed by the first rotating member and the second rotating member, the switching unit moves the first rotating member from the first position towards the second position, and
   wherein the switching unit includes a stopping unit configured to stop a movement of the first rotating member at a position between the first position and the second position after the switching unit has moved the first rotating member from the first position towards the second position.

2. The sheet conveying apparatus according to claim 1, wherein, in a case where the stopping unit stops the first rotating member at the second position, a conveyance of the sheet is stopped while the sheet is held by the second rotating member and the third rotating member.

3. The sheet conveying apparatus according to claim 1, wherein, in a state in which the second rotating member is in contact with a first surface of the sheet and the first rotating member is in contact with a second surface that is opposite to the first surface of the sheet, the switching unit moves the first rotating member from the first position towards the second position.

4. The sheet conveying apparatus according to claim 3, wherein, in a state in which the second rotating member is in contact with the first surface of the sheet and the third rotating member is in contact with the second surface of the sheet, the sheet is held by the second rotating member and the third rotating member.

5. The sheet conveying apparatus according to claim 4, wherein, in a case where the sheet is held by the second rotating member and the third rotating member by having the switching unit move the first rotating member from the second position to the first position, the first rotating member comes in contact with the first surface of the sheet and the third rotating member comes in contact with the second surface of the sheet.

6. The sheet conveying apparatus according to claim 1, further comprising a detection member disposed upstream of the first rotating member in the first direction and configured to detect a front end of the sheet that is conveyed,
wherein, in a case where a first sheet and a second sheet succeeding the first sheet are conveyed continuously and after the switching unit has moved the first rotating member from the first position towards the second position by having the stopping unit stop the movement of the first rotating member, a conveyance of the first sheet is stopped while the first sheet is held by the second rotating member and the third rotating member, and
wherein, in a case where a first sheet and a second sheet succeeding the first sheet are conveyed continuously and after the detection member has detected a front end of the second sheet by having the switching unit move the first rotating member from a position where the first rotating member had been stopped to the first position, the first sheet is conveyed in the second direction by the first rotating member and the third rotating member while the second sheet is conveyed in the first direction by the first rotating member and the second rotating member.

7. The sheet conveying apparatus according to claim 6, wherein, in a state in which the second rotating member is in contact with a first surface of the first sheet and the first rotating member is in contact with a second surface opposite the first surface of the first sheet, the switching unit moves the first rotating member from the first position to the second position before a rear end of the first sheet conveyed in the first direction has been conveyed by the first rotating member and the second rotating member.

8. The sheet conveying apparatus according to claim 6, wherein, in a case where the stopping unit has stopped the first rotating member at a position between the first position and the second position and the first sheet is held by the second rotating member and the third rotating member so that the conveyance of the first sheet is stopped when the front end of the second sheet is not detected by the detection member, the stopping unit maintains a state in which movement of the first rotating member is stopped.

9. The sheet conveying apparatus according to claim 6, wherein, in a case where first rotating member rotates, the stopping unit stops the first rotating member at the second position.

10. The sheet conveying apparatus according to claim 1, further comprising a detection member disposed upstream of the first rotating member in the first direction and configured to detect a front end of the sheet that is conveyed,
wherein, in a case where a first sheet and a second sheet succeeding the first sheet are conveyed continuously after the switching unit has moved the first rotating member from the first position towards the second position by having the stopping unit stop the movement of the first rotating member, a conveyance of the first sheet is stopped while the first sheet is held by the second rotating member and the third rotating member, and
wherein, in a case in which a predetermined time in which a front end of the second sheet has not been detected by the detection member has passed, the switching unit moves the first rotating member from a position where the first rotating member had been stopped to the first position and the first sheet is conveyed in the second direction by the first rotating member and the third rotating member.

11. The sheet conveying apparatus according to claim 1, further comprising a drive motor configured to rotate only in one direction, wherein the first rotating member receiving a driving force from the drive motor rotates in only one direction.

12. The sheet conveying apparatus according to claim 11, wherein, while the first rotating member moves between the first position and the second position, the first rotating member receiving the driving force from the drive source continues to rotate.

13. The sheet conveying apparatus according to claim 1, wherein the stopping unit stops movement of the first rotating member by stopping a transmission of a drive to the switching unit.

14. The sheet conveying apparatus according to claim 1, further comprising:
a first biasing member configured to bias the second rotating member towards the first rotating member; and
a second biasing member configured to bias the third rotating member towards the first rotating member.

15. The sheet conveying apparatus according to claim 1, wherein the second rotating member and the third rotating member rotate by following the rotation of the first rotating member.

16. The sheet conveying apparatus according to claim 1, wherein the second rotating member forms a first nip portion by coming in contact with the first rotating member, and the third rotating member forms a second nip portion by coming in contact with the first rotating member at a position that is different from the position where the second rotating member comes in contact with the first rotating member in a circumferential direction of the first rotating member.

17. The sheet conveying apparatus according to claim 1, further comprising:
a stack unit on which the sheet that has been discharged is to be stacked;
a first conveyance path configured to convey the sheet towards the first rotating member and the second rotating member; and
a second conveyance path configured to convey the sheet, which has been conveyed in the first direction by the first rotating member and the second rotating member, to the first conveyance path once again,
wherein the first direction is a direction in which the sheet is conveyed from the first rotating member towards the stack unit by the first rotating member and the second rotating member, and the second direction is a direction in which the sheet is conveyed from the stack unit towards the second conveyance path by the first rotating member and the third rotating member.

18. The sheet conveying apparatus according to claim 17, further comprising a storage portion configured to store the sheet,
wherein, by the first rotating member and the second rotating member, the sheet fed from the storage portion to the first conveyance path and the sheet conveyed from the second conveyance path to the first conveyance path are conveyed in the first direction.

19. An image forming apparatus comprising:
a storage portion configured to store a sheet;
an image forming unit configured to form an image on the sheet stored in the storage portion;
a stack unit on which the sheet discharged after an image has been formed on the discharged sheet with the image forming unit is to be stacked;
a first rotating member configured to rotate in one direction;
a second rotating member configured to convey, together with the first rotating member, a sheet in a first direction upon rotation of the first rotating member, wherein the first direction is a direction in which the sheet is conveyed from the image forming unit towards the stack unit;
a third rotating member configured to convey, together with the first rotating member, the sheet in a second direction upon rotation of the first rotating member, wherein the second direction is a direction different from the first direction; and
a switching unit configured to switch a position of the first rotating member between a first position at which the first rotating member conveys the sheet with the second rotating member or the third rotating member, and a second position at which the first rotating member is retracted relative to the first position,
wherein, before a rear end of the sheet conveyed in the first direction has been conveyed by the first rotating member and the second rotating member, the switching unit moves the first rotating member from the first position towards the second position, and
wherein the switching unit includes a stopping unit configured to stop a movement of the first rotating member at a position between the first position and the second position after the switching unit has moved the first rotating member from the first position towards the second position.

20. An image reading apparatus comprising:
an image reading unit configured to read an image on a sheet;
a stack unit on which the sheet discharged after an image on the discharged sheet has been read with the image reading unit is to be stacked;
a first rotating member configured to rotate in one direction;
a second rotating member configured to convey, together with the first rotating member, a sheet in a first direction upon rotation of the first rotating member, wherein the first direction is a direction in which the sheet is conveyed from the image reading unit towards the stack unit;
a third rotating member configured to convey, together with the first rotating member, the sheet in a second direction upon rotation of the first rotating member, wherein the second direction is a direction different from the first direction; and
a switching unit configured to switch a position of the first rotating member between a first position at which the first rotating member conveys the sheet with the second rotating member or the third rotating member, and a second position at which the first rotating member is retracted relative to the first position,
wherein, before a rear end of the sheet conveyed in the first direction is conveyed through the first rotating member and the second rotating member, the switching unit moves the first rotating member from the first position towards the second position, and
wherein the switching unit includes a stopping unit configured to stop a movement of the first rotating member at a position between the first position and the second position after the switching unit has moved the first rotating member from the first position towards the second position.

* * * * *